United States Patent
Yoshio et al.

(10) Patent No.: US 6,683,997 B1
(45) Date of Patent: Jan. 27, 2004

(54) APPARATUS AND METHOD FOR RESOLUTION TRANSFORMATION OF ORTHOGONAL TRANSFORMATION IMAGE

(75) Inventors: Hiroaki Yoshio, Tokyo (JP); Tsutomu Uenoyama, Kawasaki (JP); Osamu Iwasaki, Yokosuka (JP); Daisaku Komiya, Tokyo (JP); Kazunori Yamada, Tokyo (JP); Atsushi Ando, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 589 days.

(21) Appl. No.: 09/707,136

(22) Filed: Nov. 6, 2000

(30) Foreign Application Priority Data

Nov. 8, 1999 (JP) .......................................... 11-317160

(51) Int. Cl.$^7$ ................................................. G06K 9/32
(52) U.S. Cl. ...................................... 382/299; 382/232
(58) Field of Search ................................. 382/298, 299, 382/232, 248, 250, 280, 277, 300, 170, 233; 345/127, 128, 130; 358/525

(56) References Cited

U.S. PATENT DOCUMENTS

| | | | | |
|---|---|---|---|---|
| 5,872,874 A | * | 2/1999 | Natarajan | 382/298 |
| 5,995,657 A | * | 11/1999 | Sunakawa | 382/170 |
| 6,078,690 A | * | 6/2000 | Yamada et al. | 382/233 |
| 6,483,944 B1 | * | 11/2002 | Sugahara et al. | 382/232 |

FOREIGN PATENT DOCUMENTS

| EP | 740 269 A2 | 10/1996 |
|---|---|---|
| JP | 8-180194 | 7/1996 |

OTHER PUBLICATIONS

IBM Technical Disclosure Bulletin, "Non-Commensurable Scaling Ratios Using Inverse/Forward/Inverse Transform Combination", Jun. 1995, pp. 475–478.
S. Panchanathan, N. Gamaz, A. Jain, "JPEG Based Scalable Image Compression", revised Sep. 29, 1995, Computer Communications, pp. 1001–1012.
V. Bhaskaran, "Mediaprocessing in the Compressed Domain", 1996 IEEE, Hewlett–Packard Laboratories, pp. 204–209.
Qingwen Hu and Sethuranman Panchanathan, "Image/Video Spatial Scalability in Compressed Domain", IEEE, Feb. 1998, pp. 23–31.
Ricardo L. de Querioz, Processing JPEG–Compressed Images and Documents, IEEE, Dec. 1998, pp. 1661–1672.

* cited by examiner

*Primary Examiner*—Samir Ahmed
*Assistant Examiner*—Vikkram Bali
(74) *Attorney, Agent, or Firm*—Pearne & Gordon LLP

(57) ABSTRACT

A resolution transformation apparatus which has longitudinal and lateral change ratio input means 101 for inputting the longitudinal and lateral change ratios of an image, low-frequency orthogonal transformation block extraction means 103 for extracting only low-frequency areas of N orthogonal transformation blocks required for resolution transformation from before-transformation orthogonal transformation image memory 102 for storing orthogonal transformation images before undergoing resolution transformation, resolution transformation means 104 for executing resolution transformation and generating M orthogonal transformation blocks from the N low-frequency orthogonal transformation blocks, and orthogonal transformation block storage means 105 for storing the Morthogonal transformation blocks after resolution transformation in after-transformation orthogonal transformation image memory 106.

24 Claims, 26 Drawing Sheets

| CHANGE RATIO | 1/8 | 2/8 | 3/8 | 4/8 | 5/8 | 6/8 | 7/8 |
|---|---|---|---|---|---|---|---|
| NUMBER OF ORTHOGONAL TRANSFORMATION BLOCKS | 8 | 4 | 8 | 2 | 8 | 4 | 8 |
| EXTRACTION AREAS | 1 | 2 | 3 | 4 | 5 | 6 | 7 |
| NUMBER OF AFTER-TRANSFORMATION ORTHOGONAL TRANSFORMATION BLOCKS | 1 | 1 | 3 | 1 | 5 | 3 | 7 |

FIG. 12
REDUCTION TO A THIRD
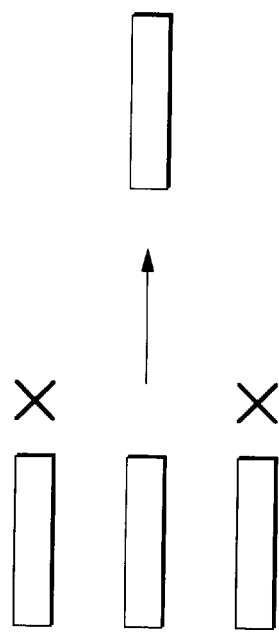
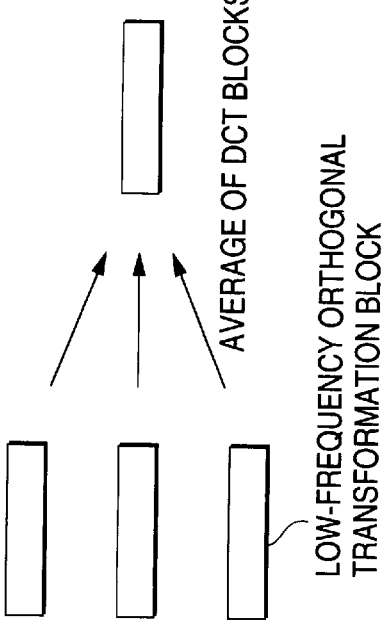

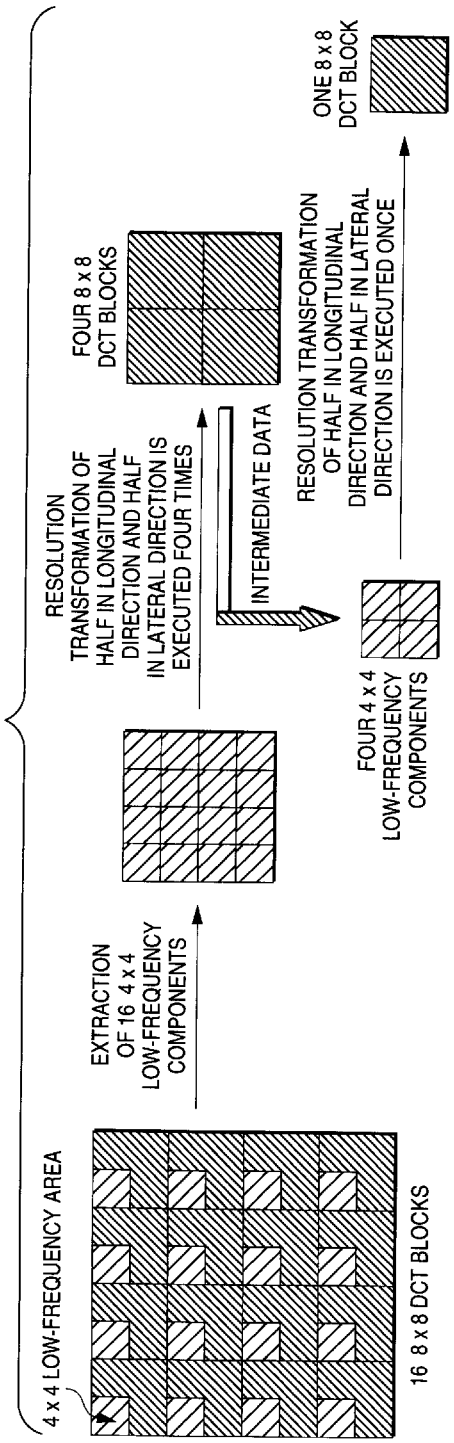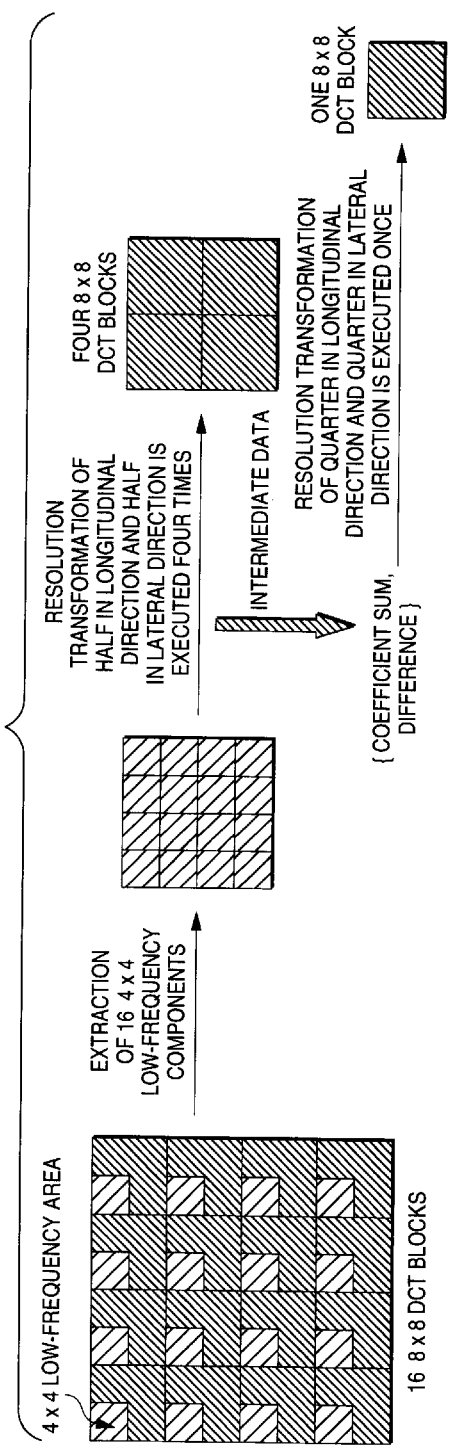

ZIGZAG SCAN

COEFFICIENTS NOT REQUIRED FOR RESOLUTION TRANSFORMATION

COEFFICIENTS NOT REQUIRED FOR RESOLUTION TRANSFORMATION

APPARATUS AND METHOD FOR RESOLUTION TRANSFORMATION OF ORTHOGONAL TRANSFORMATION IMAGE

BACKGROUND OF THE INVENTION

This invention relates to an apparatus and a method of transforming a compressed image with one resolution to a compressed image with a different resolution at an orthogonal transformation coefficient level.

In recent years, a large number of image compression techniques using DCT (Discrete Cosine transform) have been proposed. For example, H.261 moving image coding for video conferences of CCITT (Comite Consultatif Internationale Telegraphique Expert Group), MPEG (Moving Picture Experts Group) moving image coding of ISO (International Standards Organization), JPEG (Joint Photographic Expert Group) still image coding of ISO and CCITT, and the like can be named.

Generally, to transform the resolution of a discrete-cosinetransformed image, the image is restored to the non-compression state using inverse DCT (IDCT) and thinning-out processing, etc., is performed for the image for transforming the resolution of the image, then DCT is again executed.

However, the resolution transformation method requires the image processing of DCT and inverse DCT in addition to the resolution transformation processing, and, therefore, high-speed processing cannot be performed. Applications of transforming the resolution of a discret ecosine transformed image at high speed, such as a program picture thumbnail function of scaling down a plurality of program pictures received in a digital broadcast (MPEG) and displaying a plurality of programs on one screen, are likely to be necessary in the future.

The method of transforming the resolution of an image at high speed is disclosed, for example, in JP-A-8-180194. In the method, as shown in FIG. 1 in JP-A-8-180194, image coded data is decoded into orthogonal transformation coefficient data by variable-length decoding means and inverse quantization means, the resolution of the data is transformed at an orthogonal transformation coefficient level by transformation coefficient combining means for generating one transformation coefficient block from two or more (n) transformation coefficient blocks, and the orthogonal transformation coefficient data is again coded by quantization means and variable-length coding means, whereby the effect of being capable of transforming the resolution at high speed at the orthogonal transformation coefficient level can be produced without involving image processing of orthogonal transformation and orthogonal inverse transformation.

As the method of transforming the resolution at the orthogonal transformation coefficient level, the case where one orthogonal transformation block is calculated from two×two orthogonal transformation blocks (reduction to a half in a longitudinal direction and a half in a lateral direction) as shown in FIG. 25 is taken as an example.

In the description to follow, two-dimensional DCT (IDCT) with eight rows and eight columns is used as orthogonal (inverse) transformation and a block consisting of A rows and B columns of DCT coefficients is defined as an A×B DCT block, anon-compression block with A rows and B columns is defined as an A×B non-compression block, and two-dimensional DCT (IDCT) with A rows and B columns is defined as DCT A×B (IDCT A×B). A transformation matrix for generating one 8×8 DCT block from two×two of 8×8 DCT blocks is calculated by the following method:

1. Two×two of 8×8 DCT blocks are subjected to IDCT 8×8 to restore to 16×16 non-compression blocks.

2. The 16×16 non-compression blocks are subjected to DCT 16×16 to generate 16×16 DCT blocks.

3. Low-frequency 8×8 DCT areas of the 16×16 DCT blocks are adopted as 8×8 DCT blocks after transformation.

4. A transformation matrix for directly performing computations 1 to 3 is calculated.

Generally, DCT (IDCT) computation can be represented as matrix computation and thus the above-mentioned transformation matrix can also be calculated. Therefore, resolution transformation at a DCT coefficient level can be accomplished.

In the related art, however, resolution transformation processing is performed using all orthogonal transformation coefficients before resolution transformation, thus a problem of an increase in the computation amount for performing resolution transformation in response to the longitudinal and lateral change ratios occurs.

The transformation matrix or transformation expression of resolution transformation must be generated in response to the longitudinal and lateral change ratios; this is a problem.

A method of executing resolution transformation of one-dimensional orthogonal transformation blocks in response to the longitudinal and lateral change ratios of an image is not designed.

To perform matrix computation of resolution transformation using a transformation matrix, a speeding-upmethod using the characteristics of orthogonal transformation is shown concerning the even-numbered'th coefficients of the found orthogonal transformation block, but not shown concerning the odd-numbered'th coefficients.

To generate orthogonal transformation blocks with a plurality of resolutions at the same time, generally transformation matrixes are generated in response to the longitudinal and lateral change ratios and resolution transformation processing is performed separately.

Generally, image compression and decompression processing inverse quantization and quantization processing, but hitherto, a resolution transformation method containing quantization has not been designed.

The transformation expression of resolution transformation containing quantization must be generated in response to the longitudinal and lateral change ratios; this is a problem.

To generate orthogonal transformation blocks with a plurality of resolutions at the same time, hitherto a resolution transformation method containing quantization has not been designed.

SUMMARY OF THE INVENTION

To solve the problems, in the invention, first only low-frequency areas of orthogonal transformation blocks required for resolution transformation are extracted and resolution transformation processing is performed. Thus, the effect of suppressing an increase in the computation amount for resolution transformation in response to the longitudinal and lateral change ratios is produced.

Second, the transformation matrixes or transformation expressions of resolution transformation corresponding to all longitudinal and lateral change ratios are previously stored in nonvolatile memory. Thus, the effect of being capable of decreasing processing of generating each transformation matrix or transformation expression of resolution transformation in response to the longitudinal and lateral change ratios is produced.

Third, if an image made up of one-dimensional orthogonal transformation blocks in a lateral direction, resolution transformation of averaging processing or thinning-out processing among orthogonal transformation blocks is performed in a longitudinal direction, then resolution transformation in orthogonal transformation block in the lateral direction is executed. Thus, the effect of being capable of executing resolution transformation of one-dimensional orthogonal transformation blocks in two-dimensional directions of longitudinal and lateral directions is produced.

Fourth, in one-dimensional orthogonal transformation, the even-numbered'th and odd-numbered'th coefficients of the orthogonal transformation block after resolution transformation are calculated using the nature of orthogonal transformation. In two-dimensional orthogonal transformation, the coefficients on (even-numbered rows, even-numbered columns), (even-numbered rows, odd-numbered columns), (odd-numbered rows, even-numbered columns), and (odd-numbered rows, odd-numbered columns) of the orthogonal transformation block after resolution transformation are calculated using the nature of orthogonal transformation. Thus, the effect of improving the computation processing of resolution transformation is produced.

Fifthly, to generate orthogonal transformation blocks with a plurality of resolutions at the same time, the intermediate information data generated for one resolution transformation processing is used for another resolution transformation processing. Thus, the effect of improving the resolution transformation processing and the image quality after resolution transformation is produced.

Sixthly, the quantization values and quantization matrix of orthogonal transformation blocks before and after resolution transformation are input and requantization is also performed at the same time in the resolution transformation process. Thus, the effect of improving the computation efficiency of the whole resolution transformation also containing quantization is produced.

Seventhly, to execute resolution transformation containing quantization, constant parts of transformation expressions multiplied by the coefficient ratio of a default quantization matrix are stored in nonvolatile memory corresponding to all longitudinal and lateral change ratios. Thus, the effect of being capable of eliminating processing of generating the transformation expression of resolution transformation containing quantization in response to the longitudinal and lateral change ratios is produced.

Eighthly, to generate orthogonal transformation blocks with a plurality of resolutions from a plurality of orthogonal transformation blocks having the same quantization value, the intermediate information data after quantization generated for one resolution transformation processing is used for another resolution transformation processing. Thus, the effect of improving the computation efficiency of the whole resolution transformation also containing quantization is produced.

BRIEF DESCRIPTION OF THE DRAWINGS

FIG. 12 is a drawing to describe resolution transformation in a longitudinal direction in the second embodiment of the invention;

FIGS. 16A & B is a drawing to describe processing of generating images with different resolutions at the same time in the third embodiment of the invention;

DETAILED DESCRIPTION OF THE PREFERRED EMBODIMENTS

First Embodiment

Figure 1:
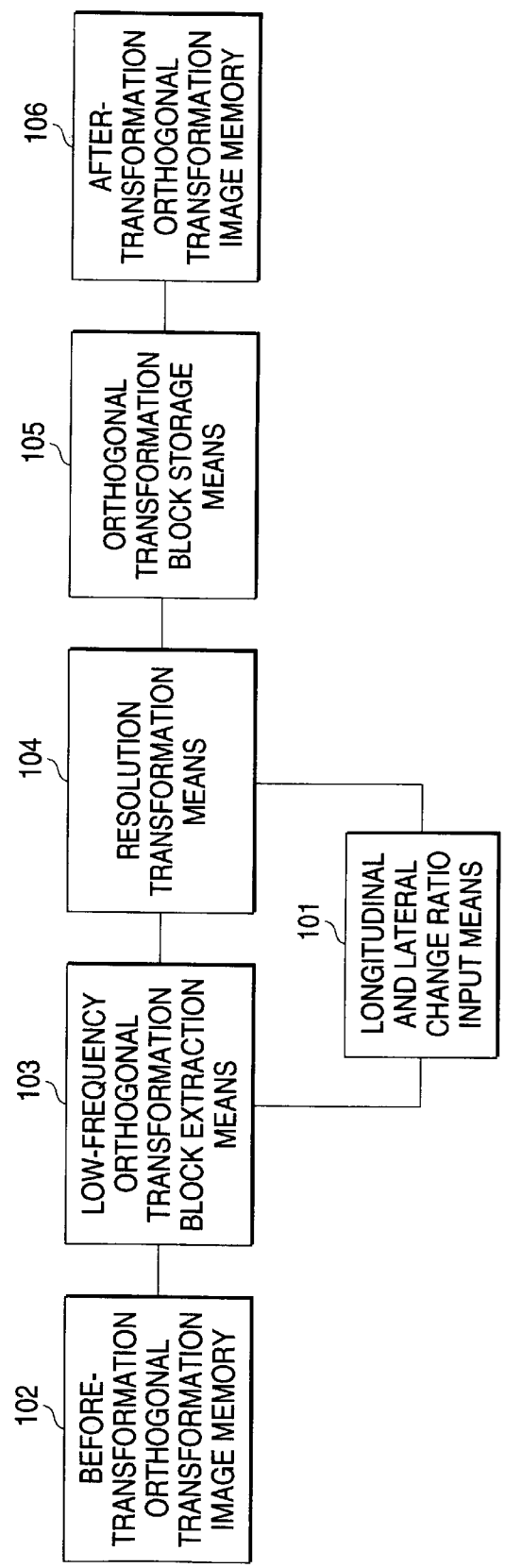
FIG. 1 is a block diagram to show the configuration of a resolution transformation apparatus in a first embodiment of the invention.

In a first embodiment of the invention, an apparatus for extracting only low-frequency areas of orthogonal transformation blocks required for resolution transformation and performing resolution transformation processing, an apparatus for calculating the coefficient of an orthogonal transformation block at high speed using the characteristic of orthogonal transformation, and an apparatus for performing resolution transformation processing at high speed using nonvolatile memory In FIG. 1, the resolution transformation apparatus of an orthogonal transformation image comprises longitudinal and lateral change ratio input means 101 for inputting the longitudinal and lateral change ratios of an image, low-frequency orthogonal transformation block extraction means 103 for determining the number of orthogonal transformation blocks required for resolution transformation, N, from the longitudinal and lateral change ratios input from the longitudinal and lateral change ratio input means 101 and extracting only low-frequency areas of the N orthogonal transformation blocks required for resolution transformation from before-transformation orthogonal transformation image memory 102 for storing orthogonal transformation images before undergoing resolution transformation, resolution transformation means 104 for determining the number of orthogonal transformation blocks to be generated after resolution transformation, M, from the longitudinal and lateral change ratios input from the longitudinal and lateral change ratio input means 101 and executing resolution transformation and generating M orthogonal transformation blocks from the N low-frequency orthogonal transformation blocks extracted by the low-frequency orthogonal transformation block extraction means 103, and orthogonal transformation block storage means 105 for storing the M orthogonal transformation blocks generated by the resolution transformation means 104 in after-transformation orthogonal transformation image memory 106 for storing orthogonal transformation images after undergoing resolution transformation.

The orthogonal transformation includes one-dimensional orthogonal transformation of transforming a block consisting of a plurality of pixels in one dimension into frequency component and two-dimensional orthogonal transformation of transforming a block consisting of a plurality of pixels in two dimensions into frequency component. In JPEG, MPEG, etc., two-dimensional DCT8×8 of calculating the correlation between the pixels of eight pixels in a horizontal direction and eight pixels in a vertical direction is used as orthogonal transformation. In the description to follow, two-dimensional DCT8×8 is used.

Figure 2:
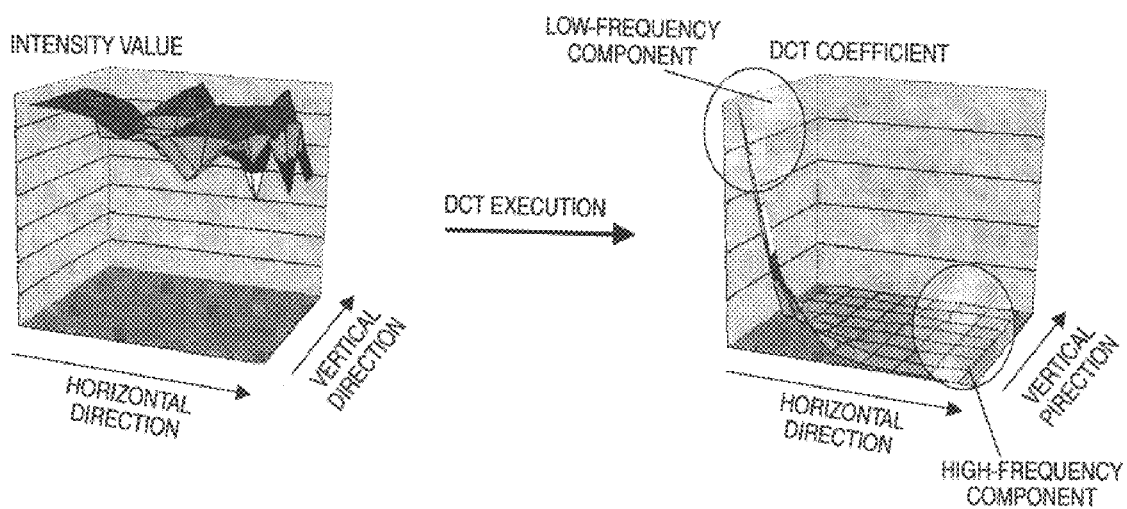
FIG. 2 is a drawing to describe the frequency characteristic after DCT.

As shown in FIG. 2, if an uncompressed two-dimensional image is subjected to DCT, there is a characteristic of gathering energy toward low frequency after DCT. The low-frequency orthogonal transformation block extraction means 103 determines the number of orthogonal transformation blocks required for resolution transformation, N, and the low-frequency areas to be extracted in response to the longitudinal and lateral change ratios input from the longitudinal and lateral change ratio input means 101.

The determination method is as follows: Using a table in FIG. 3, the number of orthogonal transformation blocks (V blocks in the longitudinal direction and H blocks in the lateral direction) and each extraction area (v pixels in the longitudinal direction and h pixels in the lateral direction) responsive to the longitudinal and lateral change ratios are found and the number of orthogonal transformation blocks required for resolution transformation, N=V*H, and the low-frequency area to be extracted, v×h, are determined.

For example, to reduce to a half in both longitudinal and lateral directions, the number of orthogonal transformation blocks becomes V=2 and H=2 and the extraction area becomes v=4 and h=4, thus 4×4 low frequency areas of two×two (four) 8×8DCT blocks are extracted.

The resolution transformation means 104 executes resolution transformation at the DCT coefficient level using the low-frequency orthogonal transformation blocks extracted by the low-frequency orthogonal transformation block extraction means 103 and generates M orthogonal transformation blocks. The determination method of M is as follows: Using the table in FIG. 3, the number of after-transformation orthogonal transformation blocks (V1 blocks in the longitudinal direction and H1 blocks in the lateral direction) responsive to the longitudinal and lateral change ratios is found and M=V1*H1 is calculated. For example, to reduce to a half in both longitudinal and lateral directions, the number of after-transformation orthogonal transformation blocks becomes V1=1 and H1=1, thus M=1×1 (one block).

Figures 3, 4:
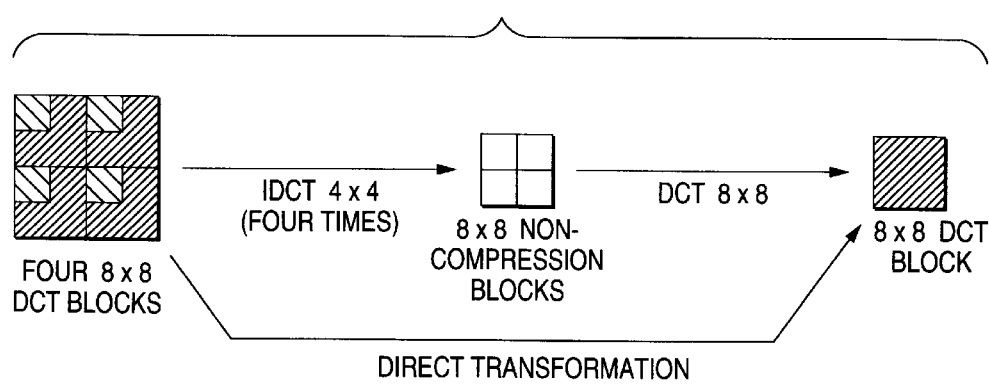
FIG. 3 is a drawing to show information indicating the numbers of orthogonal transformation blocks before and after resolution transformation and extracted low-frequency areas responsive to the longitudinal or lateral change ratio.
FIG. 4 is a drawing to show processing of the resolution transformation apparatus in a first embodiment of the invention.

The resolution transformation method at the DCT coefficient level will be discussed using the case where four 8×8DCT blocks are reduced to one 8×8DCT block as shown in FIG. 4. First, 8×8 non-compression blocks are calculated from 4×4 low-frequency areas of the four 8×8DCT blocks. Letting a matrix representing the 4×4 low-frequency areas be X, a matrix representing the 8×8 non-compression blocks be Y, and a transformation matrix of IDCT4×4 be IT44, the following expression (1) is established:

$$[Y] = \begin{bmatrix} IT44 & 0 \\ 0 & IT44 \end{bmatrix} [X] \begin{bmatrix} IT44^T & 0 \\ 0 & IT44^T \end{bmatrix} \quad (1)$$

where AT represents transpose of a matrix of A.

Next, 8×8DCT block is calculated from the 8×8 non-compression blocks. Letting a matrix of the 8×8 noncompression blocks be T88, the following expression (2) holds:

$$[Z] = [T88][Y][T88^T] \quad (2)$$

$$[Z] = [T88] \begin{bmatrix} IT44 & 0 \\ 0 & IT44 \end{bmatrix} [X] \begin{bmatrix} IT44^T & 0 \\ 0 & IT44^T \end{bmatrix} [T88^T] \quad (3)$$

If expressions (1) and (2) are brought together, expression (3) holds and T88 and IT44 are constant matrixes and therefore an expression for directly generating 8×8DCT block (Z) from the four 4×4 low-frequency areas (X) is found.

Since T88 and IT44 in expression (3) are constant matrixes and the matrixes at the left and right of the matrix X can be previously calculated together, the 8×8 non-compression block (Z) can be calculated from the four 8×8DCT blocks (X) simply by performing two 8×8 matrix computations. Since the two 8×8 matrix computations correspond to the DCT8×8 computation amount, processing with expression (3) can be executed at higher speed than processing in FIG. 4 performed sequentially.

To reduce four×four 8×8DCT blocks to a quarter in both longitudinal and lateral directions, 2×2 low-frequency areas of the four×four 8×8DCT blocks are also extracted and thus resolution transformation of a quarter can be executed in both longitudinal and lateral directions in the same computation amount as that with expression (3) and an increase in the computation amount in response to the longitudinal and lateral change ratios does not occur.

$$[IT44^T] = \begin{bmatrix} C_4(0) & C_4(0) & C_4(0) & C_4(0) \\ C_4(1) & C_4(3) & C_4(5) & C_4(7) \\ C_4(2) & C_4(6) & C_4(10) & C_4(14) \\ C_4(3) & C_4(9) & C_4(15) & C_4(21) \end{bmatrix}$$

(4)

$$[T88] = \begin{bmatrix} C_8(0) & C_8(0) & C_8(0) & C_8(0) & C_8(0) & C_8(0) & C_8(0) & C_8(0) \\ C_8(1) & C_8(3) & C_8(5) & C_8(7) & C_8(9) & C_8(11) & C_8(13) & C_8(15) \\ C_8(2) & C_8(6) & C_8(10) & C_8(14) & C_8(18) & C_8(22) & C_8(26) & C_8(30) \\ C_8(3) & C_8(9) & C_8(15) & C_8(21) & C_8(27) & C_8(33) & C_8(39) & C_8(45) \\ C_8(4) & C_8(12) & C_8(20) & C_8(28) & C_8(36) & C_8(44) & C_8(52) & C_8(60) \\ C_8(5) & C_8(15) & C_8(25) & C_8(35) & C_8(45) & C_8(55) & C_8(65) & C_8(75) \\ C_8(6) & C_8(18) & C_8(30) & C_8(42) & C_8(54) & C_8(66) & C_8(78) & C_8(90) \\ C_8(7) & C_8(21) & C_8(35) & C_8(49) & C_8(63) & C_8(77) & C_8(91) & C_8(105) \end{bmatrix}$$

$$C_4(x) = \begin{Bmatrix} A0^* \cos(x\pi/8) : x = 0 \\ A1^* \cos(x\pi/8) : x \neq 0 \end{Bmatrix}, \quad C_8(x) = \begin{Bmatrix} B0^* \cos(x\pi/16) : x = 0 \\ B1^* \cos(x\pi/16) : x \neq 0 \end{Bmatrix}$$

The matrixes of T88 and IT44T in expression (3) are represented as in expression (4) (A0, A1, B0, and B1 in expression (4) are constants) and the rows are called DCT4×4 base vectors and DCT8×8 base vectors. The four DCT4×4 base vectors or the eight DCT8×8 base vectors are orthogonal to each other and the inner products become zero.

Figure 5:
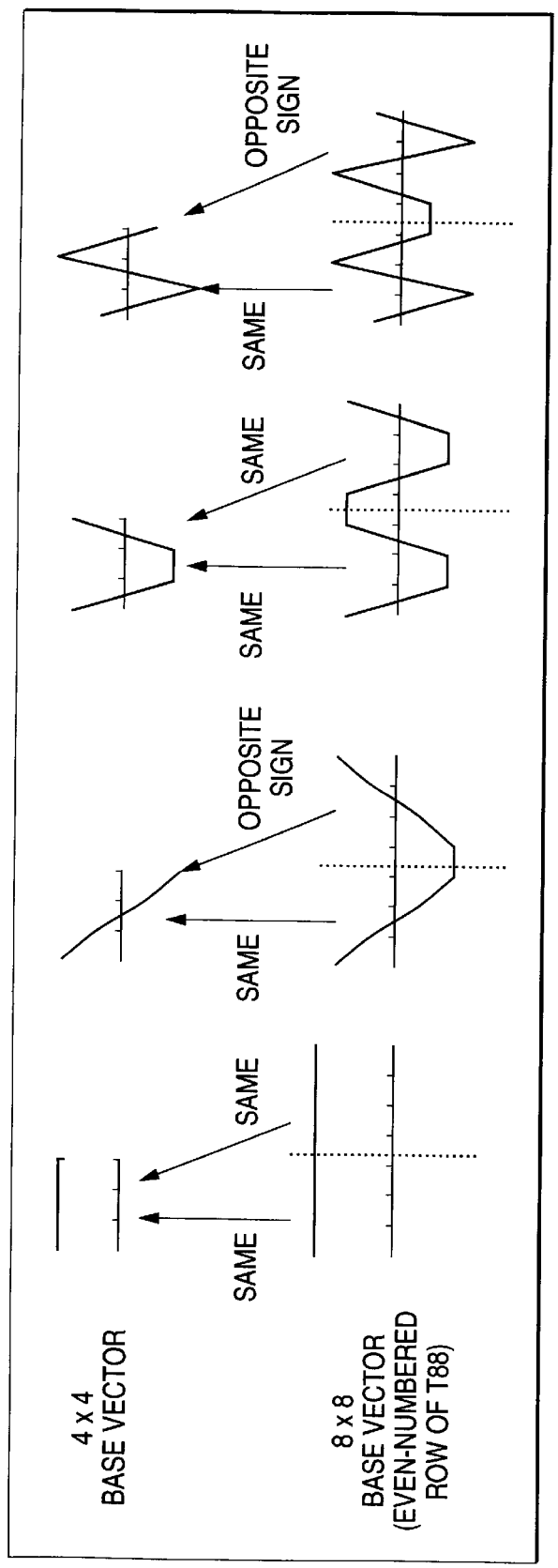
FIG. 5 is a drawing to describe the characteristics of 4×4DCT base vector and 8×8DCT base vector.

If the elements of the DCT4×4 base vectors and the four DCT8×8 base vectors corresponding to the even-numbered rows of T88 are represented on the horizontal axis and the element values are represented on the vertical axis, waveforms as shown in FIG. 5 result. From FIG. 5, the four preceding element waveforms of the DCT8×8 base vectors on the even-numbered rows of T88 become the same as the waveforms of the four DCT4×4 base vectors.

Therefore, if the DCT4×4 base vector (a0, a1, a2, a3) is represented as a DCT4×4 base expansion 1 vector of (a0, a1, a2, a3, 0, 0, 0, 0), the four DCT8×8 base vectors on the even-numbered rows of T88 and the four DCT4×4 base expansion 1 vectors become the same vectors or orthogonal vectors and the inner product at the orthogonal time becomes zero.

From FIG. 5, the four following element waveforms of the DCT8×8 base vectors on the even-numbered rows of T88 become the same as the waveforms of the four DCT4×4 base vectors or they become of opposite sign. Therefore, if the DCT4×4 base vector (a0, a1, a2, a3) is represented as a DCT4×4 base expansion 2 vector of (0, 0, 0, 0, a0, a1, a2, a3), the four DCT8×8 base vectors on the even-numbered rows of T88 and the four DCT4×4 base expansion 2 vectors become the same vectors, vectors of opposite sign, or orthogonal vectors and the inner product at the orthogonal time becomes zero.

The inner product of the DCT8×8 base vector on an even-numbered row of T88 and the DCT4×4 base expansion 1 vector (a0, a1, a2, a3, 0, 0, 0, 0) becomes the same value as the inner product of the DCT8×8 base vector on the even-numbered row of T88 and the DCT4×4 base expansion 2 vector (0, 0, 0, 0, a0, a1, a2, a3) or becomes a negative value.

Figure 6:
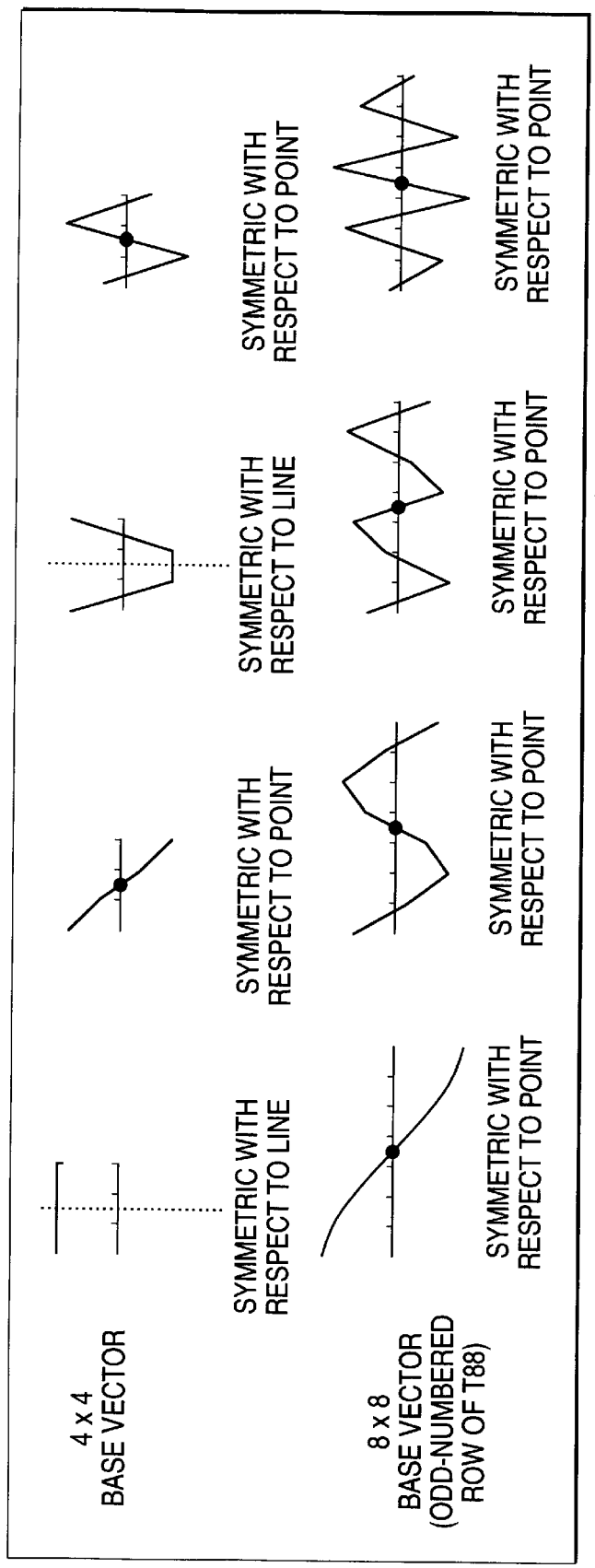
FIG. 6 is a drawing to describe the characteristics of 4×4DCT base vector and 8×8DCT base vector.

This can be proved from FIG. 6. If the elements of DCT4×4 base vector are represented on the horizontal axis and the element values are represented on the vertical axis, the vector becomes symmetric with respect to one point or line as an axis, as shown in FIG. 6.

On the other hand, if the elements of DCT8×8 base vector are represented on the horizontal axis and the element values are represented on the vertical axis, the vector becomes symmetric with respect to one point as an axis. Therefore, the inner product of the DCT8×8 base vector symmetric with respect to a point and the DCT4×4 base expansion 1 vector symmetric with respect to a line becomes the negative value of the inner product of the DCT8×8 base vector and the DCT4×4 base expansion 2 vector.

The inner product of the DCT8×8 base vector symmetric with respect to a point and the DCT4×4 base expansion 1 vector symmetric with respect to a point becomes the same value as the inner product of the DCT8×8 base vector and the DCT4×4 base expansion 2 vector.

As a result, in the matrix at the left of X in expression (3), any other than the inner product of the same vector becomes zero concerning the even-numbered rows and four having the same absolute value are contained concerning the odd-numbered rows, as in a matrix T in the following expression (5) ($\alpha_i$: Constant):

$$[T] = [T88] \begin{bmatrix} IT44 & 0 \\ 0 & IT44 \end{bmatrix} \quad (5)$$

$$[T] = \begin{bmatrix} 4A0B0 & 0 & 0 & 0 & 4A0B0 & 0 & 0 & 0 \\ \alpha 1 & \alpha 2 & \alpha 3 & \alpha 4 & -\alpha 1 & \alpha 2 & -\alpha 3 & \alpha 4 \\ 0 & A1B1 & 0 & 0 & 0 & -A1B1 & 0 & 0 \\ \alpha 5 & \alpha 6 & \alpha 7 & \alpha 8 & -\alpha 5 & \alpha 6 & -\alpha 7 & \alpha 8 \\ 0 & 0 & A1B1 & 0 & 0 & 0 & A1B1 & 0 \\ \alpha 9 & \alpha 10 & \alpha 11 & \alpha 12 & -\alpha 9 & \alpha 10 & -\alpha 11 & \alpha 12 \\ 0 & 0 & 0 & A1B1 & 0 & 0 & 0 & -A1B1 \\ \alpha 13 & \alpha 14 & \alpha 15 & \alpha 16 & -\alpha 13 & \alpha 14 & -\alpha 15 & \alpha 16 \end{bmatrix}$$

Figure 7:
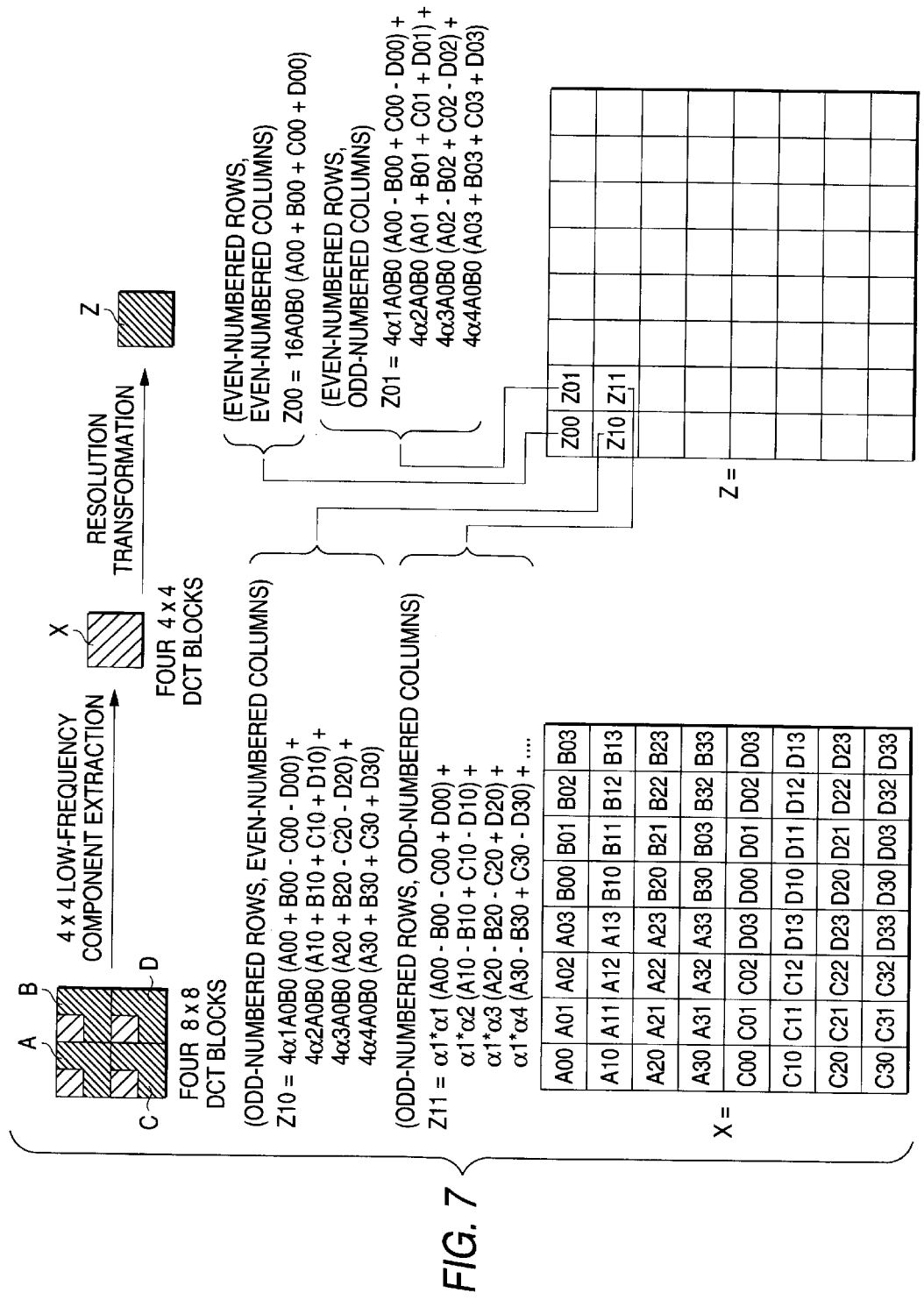
FIG. 7 is a drawing to describe a resolution transformation expression in the first embodiment of the invention.

If a matrix Z in expression (3) is found using expression (5), each of the elements of even-numbered rows, even-numbered columns can be calculated as the product of the sum (difference) of four coefficients of the matrix X and constant, each of the elements of even-numbered rows, odd-numbered columns and odd-numbered rows, even-numbered columns can be calculated as (product of sum (difference) of four coefficients and constant)*4 times and the sum, and each of the elements of odd-numbered rows, odd-numbered columns can be calculated as (product of sum (difference) of four coefficients and constant)*16 times and the sum, as shown in FIG. 7.

Therefore, it is made possible to perform processing at extremely high speed as compared with two 8×8 matrix computations. Further, as with butterfly computation of DCT, the result of the sum of four coefficients of the matrix X or the sum of two coefficients can also be effectively used to calculate the elements of even-numbered rows, even-numbered columns, even-numbered rows, odd-numbered columns, odd-numbered rows, even-numbered columns, and odd-numbered rows, odd-numbered columns at high speed.

Figure 26:
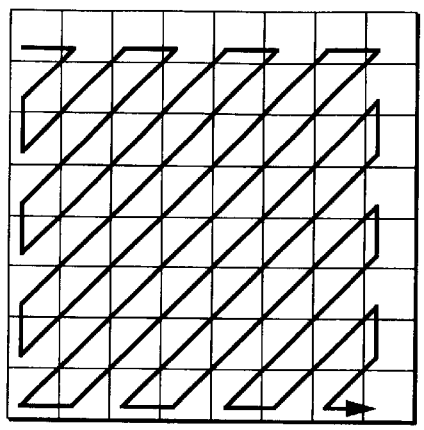
FIG. 26 is a drawing to describe a zigzag scan technique of orthogonal transformation blocks used in MPEG.
Figure 27:
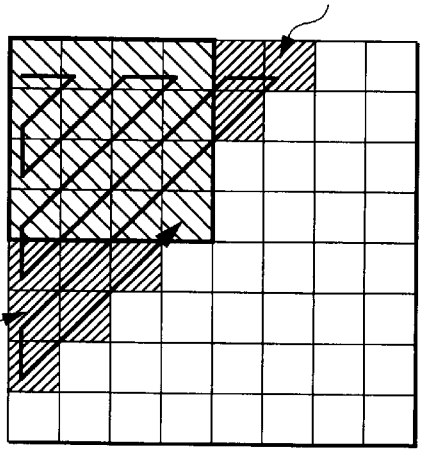
FIG. 27 is a drawing to describe a problem involved in use of the zigzag scan technique of orthogonal transformation blocks in the first embodiment of the invention.

In MPEG, to quantize and code orthogonal transformation block, a zigzag scan technique for coding the block in order starting at a low-frequency component is used, as shown in FIG. 26. For MPEG coding using the zigzag scan technique, for example, to reduce to a half in both longitudinal and lateral directions, coefficients in the areas not required for resolution transformation are also found to find 4×4 low-frequency areas of four orthogonal transformation blocks required for resolution transformation, as shown in FIG. 27.

Figure 28:
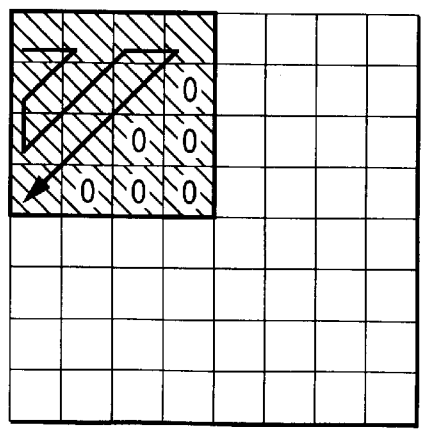
FIG. 28 is a drawing to describe a solution to the problem involved in use of the zigzag scan technique of orthogonal transformation blocks in the first embodiment of the invention.

As shown in FIG. 28, orthogonal transformation blocks assuming that when the 4×4 low-frequency area is exceeded, the subsequent coefficients of the coefficients arranged in the zigzag scan technique are zero can also be stored in the before-transformation orthogonal transformation image memory 102. In this case, the resolution transformation means 104 skips computation on the coefficients assumed to be zero in the 4×4 low-frequency area, whereby the processing speed of resolution transformation can be improved.

Figure 8:
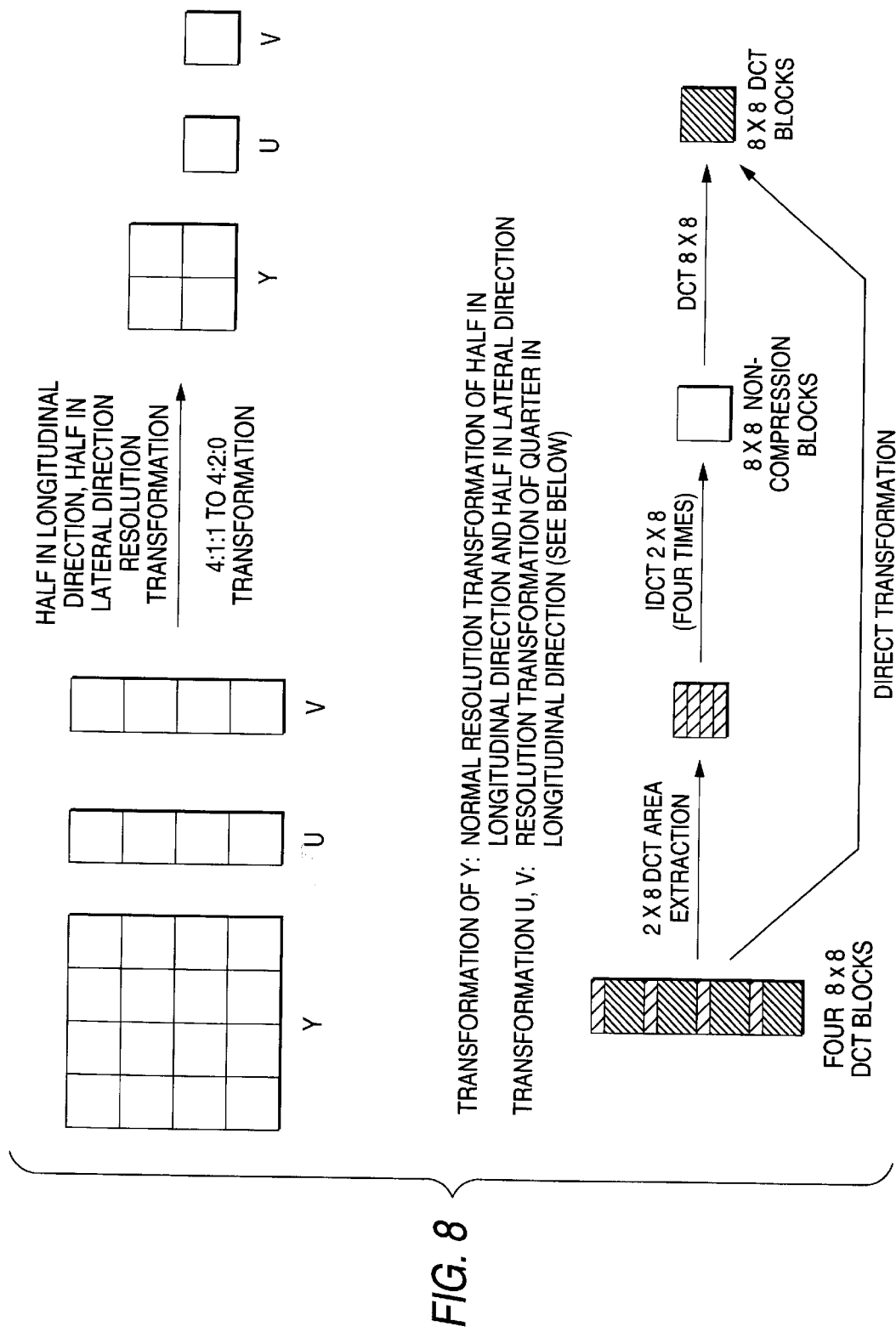
FIG. 8 is a drawing to describe 4:1:1 to 4:2:0 transformation plus resolution transformation of a half in both longitudinal and lateral directions in the first embodiment of the invention.

The resolution transformation apparatus can also be applied to the case where resolution transformation is executed while a 4:1:1 format image is transformed to a 4:2:0 format image. FIG. 8 shows the case where a 4:1:1 format image is transformed to a 4:2:0 format image while resolution transformation of a half in longitudinal and lateral directions is executed. In FIG. 8, transformation of Y (intensity) can be calculated in expression (3). Transformation of U, V (color difference) can be calculated in an expression of resolution transformation of a quarter in the longitudinal direction because resolution transformation of a half in the longitudinal direction and a half in the lateral direction and 4:1:1 to 4:2:0 format transformation of a half in the longitudinal direction and twice in the lateral direction are executed. The resolution transformation expression of a quarter in the longitudinal direction is found as in expression (6) shown below by first performing IDCT2×8 for 2×8DCT areas of four 8×8DCT blocks arranged longitudinally to calculate an 8×8 non-compression block and next performing DCT8×8 to calculate an 8×8DCT block.

Matrix X in expression (6) is a matrix representing the 2×8 low-frequency areas of the four 8×8DCT blocks in the longitudinal direction and matrix Z a matrix representing the 8×8DCT block after transformation. IDCT2×8 can be represented as transformation matrix IT22 of IDCT2×2 and transformation matrix IT88 T (=T88) of IDCT8×8 and the two matrix computation results at the right of the matrix X become unit matrix. Therefore, the resolution transformation expression of a quarter in the longitudinal direction becomes simpler than expression (3) and high-speed computation can be performed.

$$Z = [T88] \begin{bmatrix} IT22 & 0 & 0 & 0 \\ 0 & IT22 & 0 & 0 \\ 0 & 0 & IT22 & 0 \\ 0 & 0 & 0 & IT22 \end{bmatrix} [X][T88][T88^T] \quad (6)$$

$$[IT22] = \begin{bmatrix} C_2(0) & C_2(1) \\ C_2(0) & C_2(3) \end{bmatrix}, C_2(x) = \begin{cases} C0^*\cos(x\pi/4) : x = 0 \\ C0^*\cos(x\pi/4) : x \neq 0 \end{cases}$$

Figure 9:
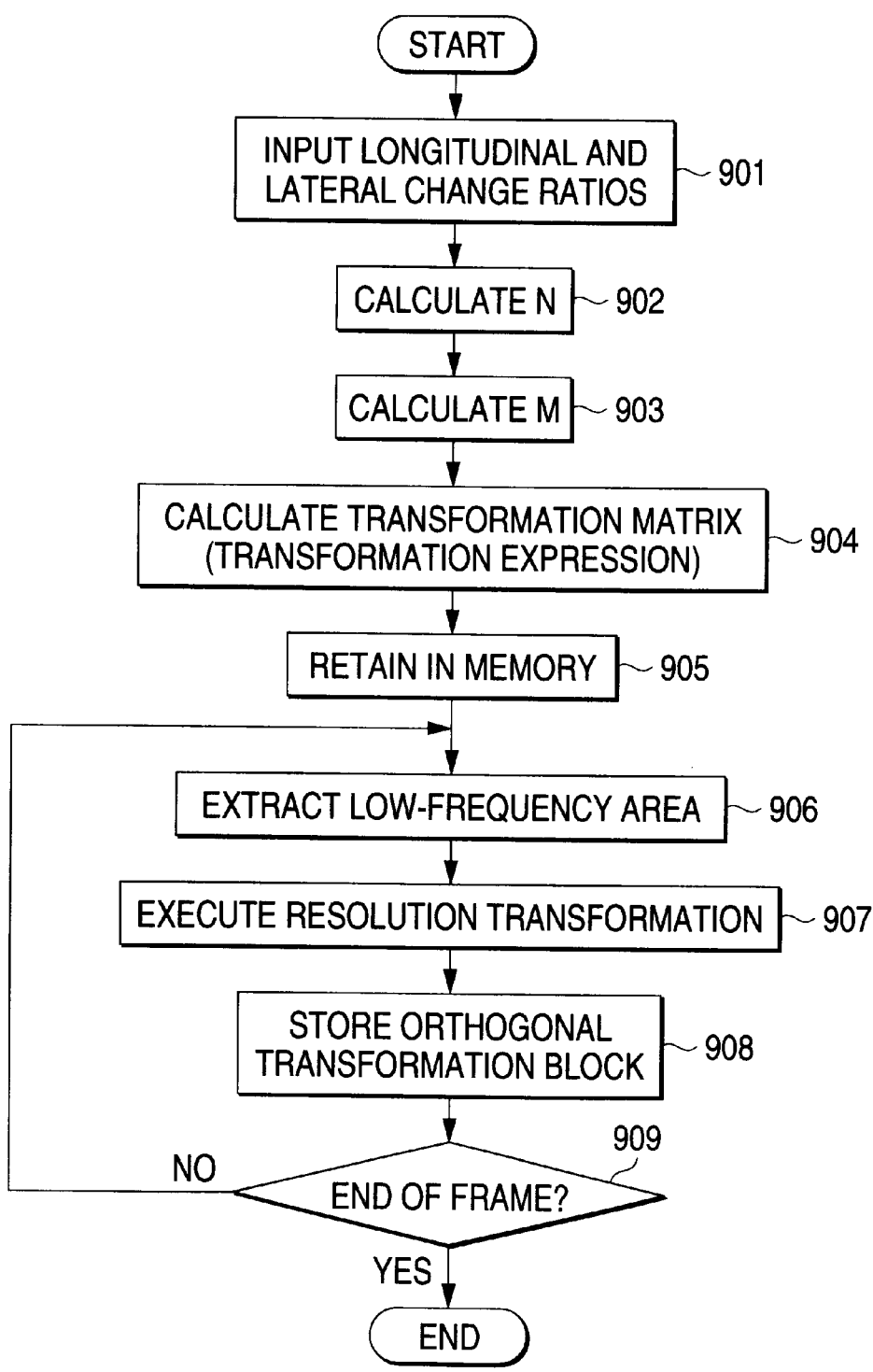
FIG. 9 is a flowchart to show the operation of the resolution transformation apparatus in the first embodiment of the invention.

FIG. 9 is a flowchart to show a processing flow of the resolution transformation apparatus in frame units. The operation is as follows:

Step 901: Longitudinal and lateral change ratios are input from the longitudinal and lateral change ratio input means 101.

Step 902: The low-frequency orthogonal transformation block extraction means 103 calculates the number of orthogonal transformation blocks required for resolution transformation, N, using the longitudinal and lateral change ratios and the table in FIG. 3.

Step 903: The resolution transformation means 104 calculates the number of orthogonal transformation blocks to be generated after resolution transformation, M, using the longitudinal and lateral change ratios and the table in FIG. 3.

Step 904: The resolution transformation means 104 calculates a transformation matrix of expression (5) or a transformation expression for calculating Z00, Z01, etc., in FIG. 7 in response to the longitudinal and lateral change ratios.

Step 905: The transformation matrix or the transformation expression calculated at step 904 is retained in temporary memory.

Step 906: The low-frequency orthogonal transformation block extraction means 103 extracts N low-frequency orthogonal transformation blocks from the before-transformation orthogonal transformation image memory 102.

Step 907: There solution transformation means 104 fetches the transformation matrix or the transformation expression retained at step 905 from the temporary memory and performs resolution transformation processing from the N low-frequency orthogonal transformation blocks to generate M orthogonal transformation blocks.

Step 908: The orthogonal transformation block storage means 105 stores the M generated orthogonal transformation blocks in the after-transformation orthogonal transformation image memory 106.

Step 909: Whether or not resolution conversion has been executed to the end of the frame image is determined. If the resolution conversion has been executed at a midpoint in the frame image, control is returned to step 906. If the resolution conversion has been executed to the end of the frame image, the processing is terminated.

Steps 904 and 905 are made unnecessary by providing nonvolatile memory previously storing transformation matrixes or transformation expressions responsive to all longitudinal and lateral change ratios, and the computation amount of the resolution transformation can be decreased.

As described above, the resolution transformation apparatus extracts only low-frequency areas of the orthogonal transformation blocks required for resolution transformation and performs resolution transformation processing, whereby an increase in the computation amount of resolution transformation in response to the longitudinal and lateral change ratios can be suppressed, so that the resolution transformation apparatus provides a large practical advantage.

The coefficients on (even-numbered rows, even-numbered columns), (even-numbered rows, odd-numbered columns), (odd-numbered rows, even-numbered columns), and (odd-numbered rows, odd-numbered columns) of orthogonal transformation block after undergoing resolution transformation are calculated using the nature of orthogonal transformation, whereby the computation amount of resolution transformation can be furthermore suppressed and thus the resolution transformation apparatus provides a large practical advantage.

The transformation matrixes or transformation expressions corresponding to all longitudinal and lateral change ratios are previously stored in nonvolatile memory, whereby processing of generating each transformation matrix of resolution transformation in response to the longitudinal and lateral change ratios can be skipped, thus there solution transformation apparatus provides a large practical advantage.

In the description, the case of a half in both longitudinal and lateral directions is taken as an example; however, if the longitudinal and lateral change ratios of 1/8, 1/4, 3/8, 1/2, 5/8, 3/4, and 7/8 are used, similar advantages can also be provided.

In the description, DCT8×8 is used as orthogonal transformation; however, if orthogonal transformation of any other two-dimensional DCT, one-dimensional DCT, wavelet transformation, etc., is used, similar advantages can also be provided.

Second Embodiment

Figure 10:
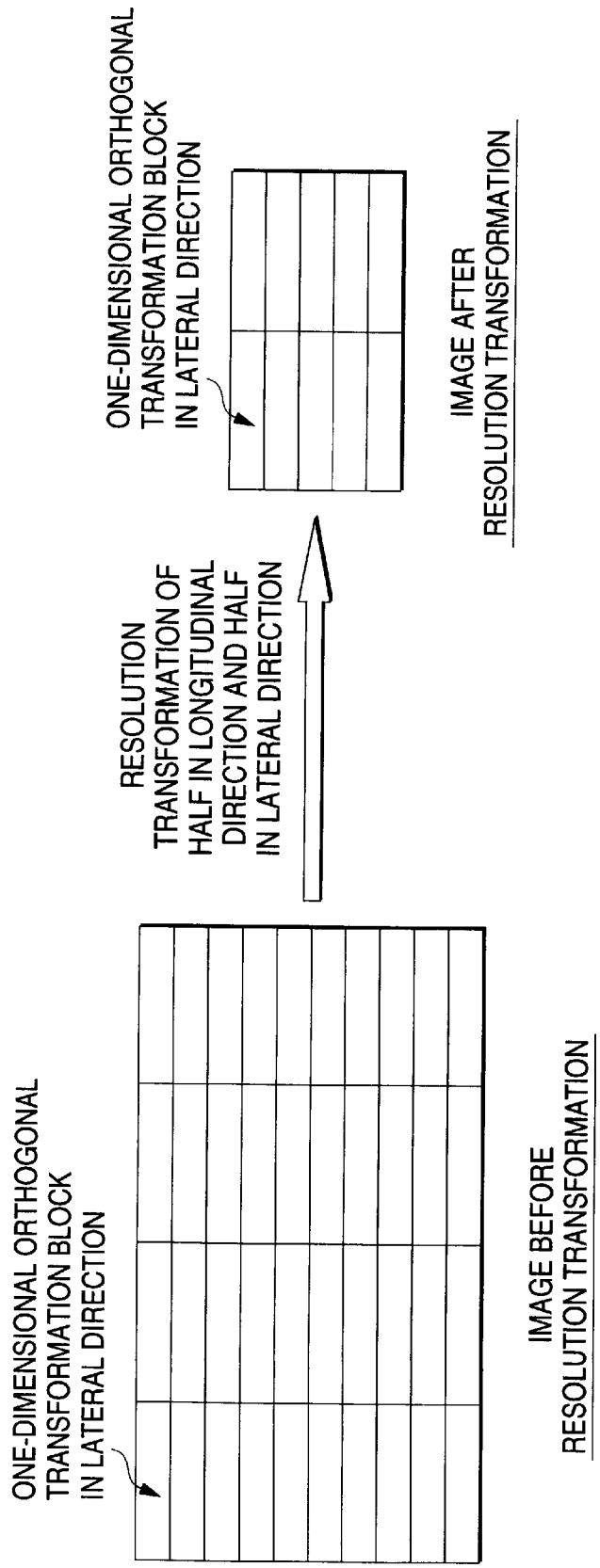
FIG. 10 is a drawing to describe resolution transformation of an image made up of one-dimensional orthogonal transformation blocks in a second embodiment of the invention.

In a second embodiment of the invention, an apparatus for executing resolution transformation of an image made up of one-dimensional orthogonal transformation blocks in a lateral direction in two-dimensional directions of longitudinal and lateral directions as shown in FIG. 10 will be discussed.

Figure 11:
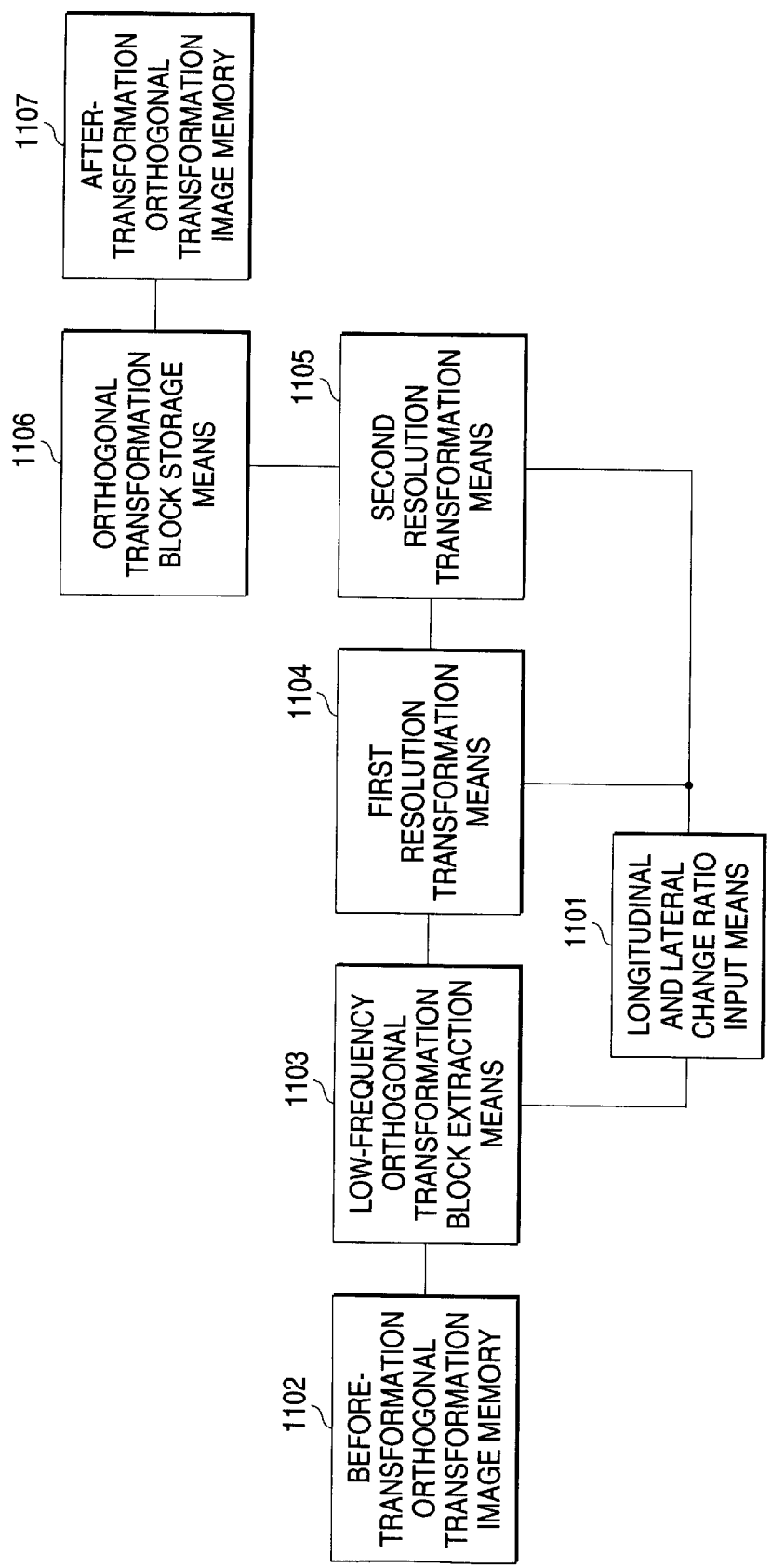
FIG. 11 is a block diagram to show the configuration of a resolution transformation apparatus in the second embodiment of the invention.

In FIG. 11, the resolution transformation apparatus applied when orthogonal transformation blocks are one-dimensional orthogonal transformation blocks in the lateral direction comprises longitudinal and lateral change ratio input means 1101 for inputting the longitudinal and lateral change ratios of an image, low-frequency orthogonal transformation block extraction means 1103 for determining the number of orthogonal transformation blocks required for resolution transformation, N, from the longitudinal and lateral change ratios input from the longitudinal and lateral change ratio input means 1101 and extracting only low-frequency areas of the N orthogonal transformation blocks required for resolution transformation from before transformation orthogonal transformation image memory 1102 for storing orthogonal transformation images before undergoing resolution transformation, first resolution transformation means 1104 for determining the number of low-frequency orthogonal transformation blocks to be generated after resolution transformation in the longitudinal direction, L, from the longitudinal change ratio input from the longitudinal and lateral change ratio input means 1101 and performing averaging processing or thinning-out processing among the N low-frequency orthogonal transformation blocks extracted by the low-frequency orthogonal transformation block extraction means 1103 to generate L low-frequency orthogonal transformation blocks, second resolution transformation means 1105 for determining the number of low-frequency orthogonal transformation blocks to be generated after resolution transformation in the lateral direction, M, from the lateral change ratio input from the longitudinal and lateral change ratio input means 1101 and executing resolution transformation in the L low-frequency orthogonal transformation blocks generated by the first resolution transformation means 1104 to generate M orthogonal transformation blocks, and orthogonal transformation block storage means 1106 for storing the M orthogonal transformation blocks generated by the second resolution transformation means 1105 in after-transformation orthogonal transformation image memory 1107 for storing orthogonal transformation images after undergoing resolution transformation.

The low-frequency orthogonal transformation block extraction means 1103 determines the number of orthogonal transformation blocks required for resolution transformation, N, and the low-frequency areas to be extracted in response to the longitudinal and lateral change ratios input from the longitudinal and lateral change ratio input means 1101. The determination method is as follows: First, using the table in FIG. 3, the number of orthogonal transformation blocks (H blocks in the lateral direction) and each extraction area (h pixels in the lateral direction) responsive to the lateral change ratio are found. Next, the number of orthogonal transformation blocks responsive to the longitudinal change ratio, B, is found from the longitudinal change ratio (A/B (A and B: Natural numbers, A<B)).

The number of orthogonal transformation blocks required for resolution transformation, N=B*H, and the low-frequency area to be extracted, 1×h, are determined. The first resolution transformation means 1104 performs averaging processing or thinning-out processing for the low-frequency orthogonal transformation blocks extracted by the low-frequency orthogonal transformation block extraction means 1103 and executes resolution transformation processing of A/B in the longitudinal direction to generate L=A*H low-frequency orthogonal transformation blocks.

For example, as shown in FIG. 12, to execute resolution transformation of a third in the longitudinal direction, averaging processing of finding the average of coefficients of three low-frequency orthogonal transformation blocks and setting the found average as the coefficient of the low-frequency orthogonal transformation block after the resolution transformation or thinning-out processing of selecting one from three low-frequency orthogonal transformation blocks as the low-frequency orthogonal transformation block after the resolution transformation is performed. The longitudinal change ratio can be set as desired by using the thinning-out processing and averaging processing in combination. The second resolution transformation means 1105 executes resolution transformation using the low-frequency areas 1×h of the L orthogonal transformation blocks generated by the first resolution transformation means 1104 to generate Morthogonal transformation blocks. The determination method of M is as follows: Using the table in FIG. 3, the number of after-transformation orthogonal transformation blocks responsive to the lateral change ratio (1/8, 1/4, 3/8, 1/2, 5/8, 3/4, 7/8), H1, is found and M=A*H1 is calculated. The resolution transformation method of one-dimensional orthogonal transformation blocks of the second resolution transformation means 1105 is similar to the resolution transformation method of two-dimensional orthogonal transformation blocks in the first embodiment.

Since the computation amount of the averaging processing or thinning-out processing of the first resolution transformation means 1104 is less than that of the resolution transformation processing of orthogonal transformation blocks of the second resolution transformation means 1105, if processing of the second resolution transformation means 1105 is performed after processing of the first resolution transformation means 1104, the computation amount can be decreased as compared with the case where processing of the first resolution transformation means 1104 is performed after processing of the second resolution transformation means 1105.

Figure 13:
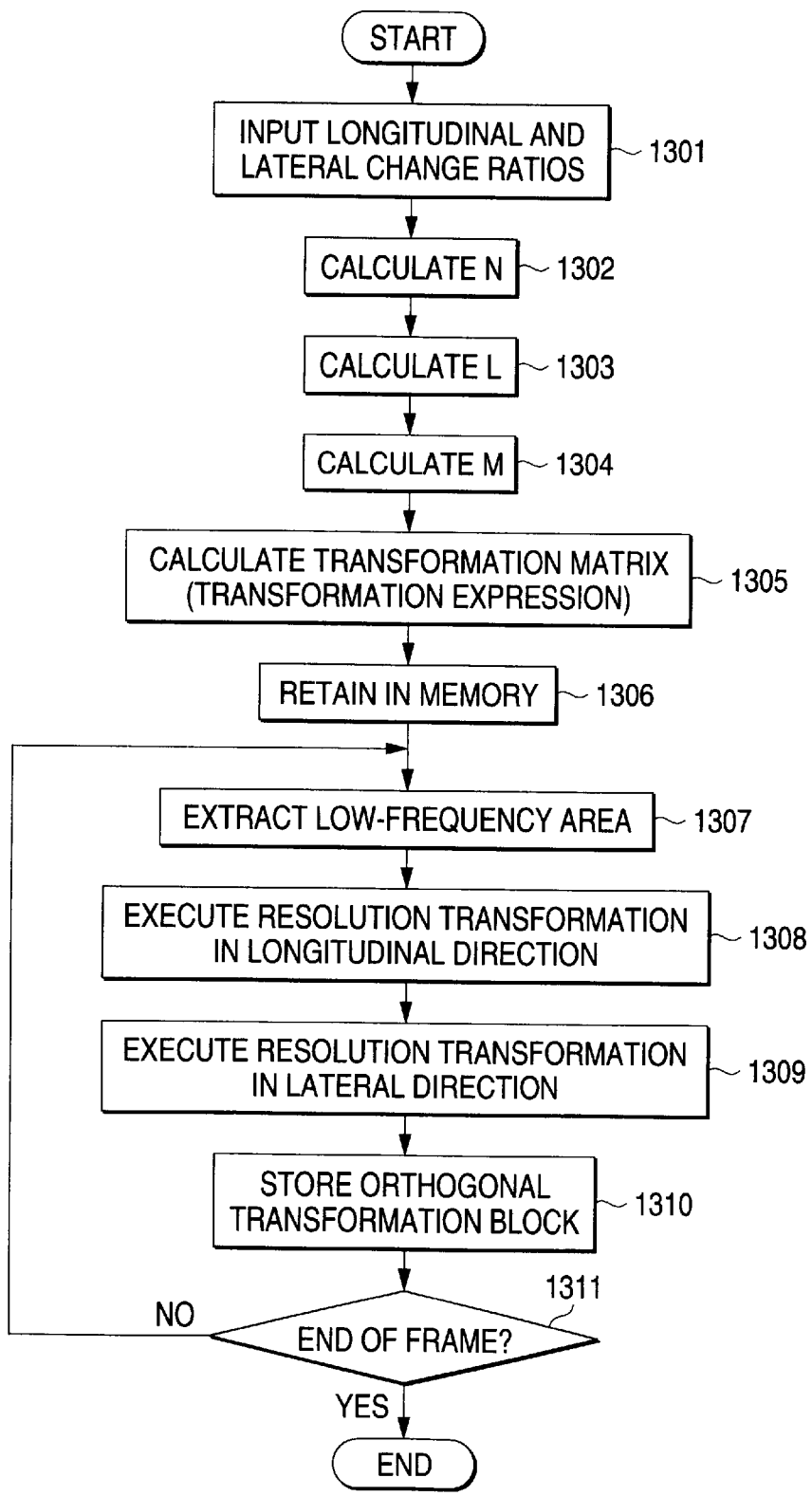
FIG. 13 is a flowchart to show the operation of the resolution transformation apparatus in the second embodiment of the invention.

FIG. 13 is a flowchart to show a processing flow of the resolution transformation apparatus in frame units. The operation is as follows:

Step 1301: Longitudinal and lateral change ratios are input from the longitudinal and lateral change ratio input means 1101.

Step 1302: The low-frequency orthogonal transformation block extraction means 1103 calculates the number of orthogonal transformation blocks required for resolution transformation, N, using the longitudinal and lateral change ratios and the table in FIG. 3.

Step 1303: The first resolution transformation means 1104 calculates the number of orthogonal transformation blocks to be generated after resolution transformation in the longitudinal direction, L, using the longitudinal and lateral change ratios and the table in FIG. 3.

Step 1304: The second resolution transformation means 1105 calculates the number of orthogonal transformation blocks to be generated after resolution transformation in the longitudinal and lateral directions, M, using the longitudinal and lateral change ratios and the table in FIG. 3. Step 1305: The second resolution transformation means 1105 calculates a transformation matrix or a transformation expression in response to the lateral change ratio.

Step 1306: The transformation matrix or the transformation expression calculated at step 1305 is retained in temporary memory.

Step 1307: The low-frequency orthogonal transformation block extraction means 1103 extracts low-frequency orthogonal transformation blocks of N low-frequency orthogonal transformation blocks from the before-transformation orthogonal transformation image memory 1102.

Step 1308: The first resolution transformation means 1104 executes resolution transformation in the longitudinal direction from the N low-frequency orthogonal transformation blocks to generate L low-frequency orthogonal transformation blocks.

Step 1309: The second resolution transformation means 1105 fetches the transformation matrix or the transformation expression retained at step 1306 from the temporary memory and performs resolution transformation processing from the L low-frequency orthogonal transformation blocks to generate M orthogonal transformation blocks.

Step 1310: The orthogonal transformation block storage means 1106 stores the M generated orthogonal transformation blocks in the after-transformation orthogonal transformation image memory 1107.

Step 1311: Whether or not resolution conversion has been executed to the end of the frame image is determined. If the resolution conversion has been executed at a midpoint in the frame image, control is returned to step 130. If the resolution conversion has been executed to the end of the frame image, the processing is terminated.

As described above, to execute resolution transformation of one-dimensional orthogonal transformation blocks in the lateral direction in the two-dimensional directions of the longitudinal and lateral directions, the resolution transformation apparatus first executes resolution transformation of averaging processing or thinning-out processing among the orthogonal transformation blocks and next executes resolution transformation in the orthogonal transformation block in the lateral direction, whereby the whole computation amount of the resolution transformation can be decreased, so that the resolution transformation apparatus provides a large practical advantage. In the description, the case where an image is made up of one-dimensional orthogonal transformation blocks in the lateral direction is taken as an example; however, if the image is made up of one-dimensional orthogonal transformation blocks in the longitudinal direction, similar advantages can also be provided. In the description, one-dimensional DCT in eight-pixel units is used as orthogonal transformation; however, if orthogonal transformation of any other one-dimensional DCT, wavelet transformation, etc., is used, similar advantages can also be provided.

Third Embodiment

In a third embodiment of the invention, an apparatus for effectively using intermediate information data generated for one resolution transformation processing for another resolution transformation processing when orthogonal transformation blocks with a plurality of resolutions are generated at the same time will be discussed.

Figure 14:
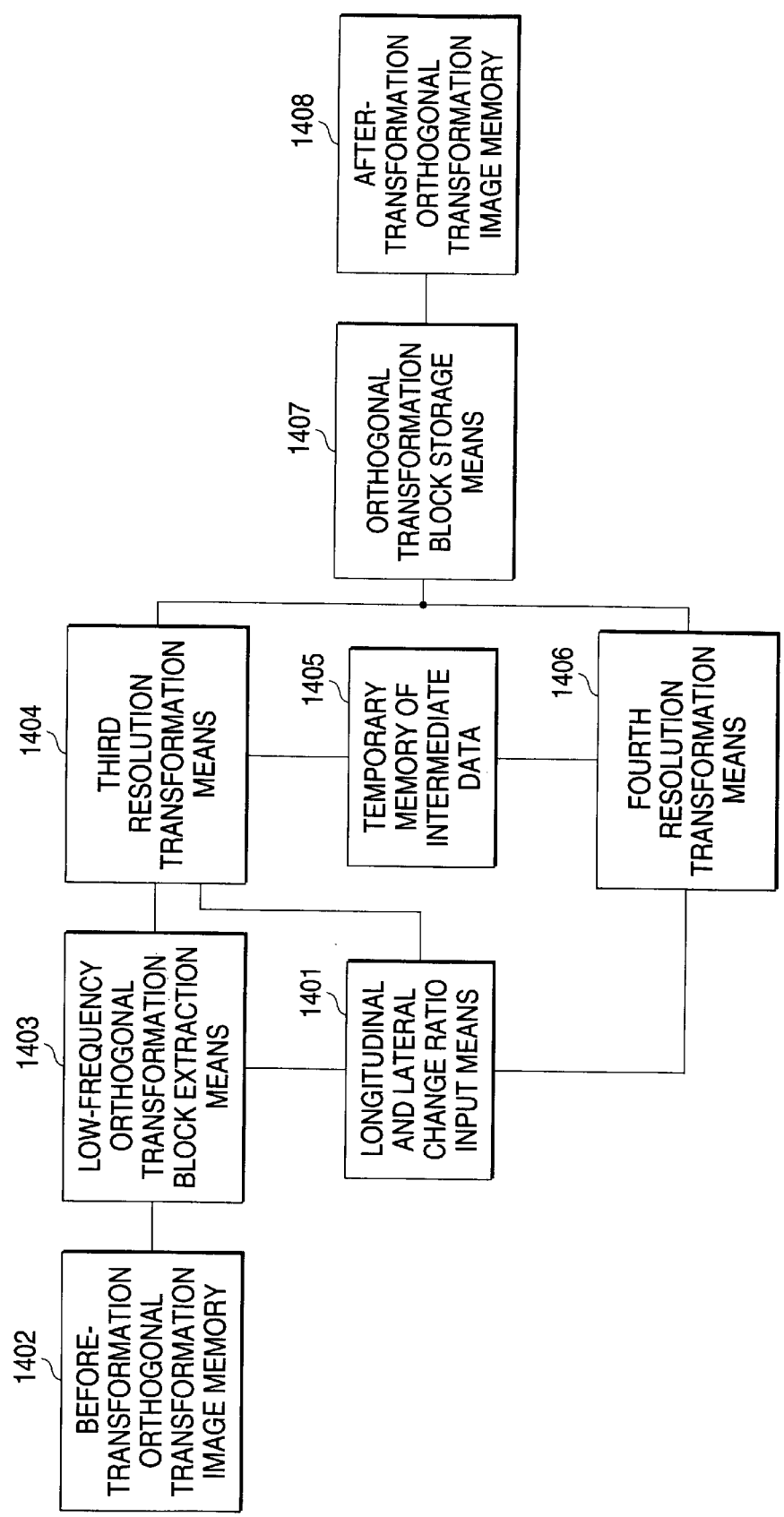
FIG. 14 is a block diagram to show the configuration of a resolution transformation apparatus in a third embodiment of the invention.

In FIG. 14, the resolution transformation apparatus of orthogonal transformation blocks comprises longitudinal and lateral change ratio input means 1401 for inputting two pairs of longitudinal and lateral change ratios of an image, low-frequency orthogonal transformation block extraction means 1403 for determining the number of orthogonal transformation blocks required for resolution transformation, N, from the two pairs of longitudinal and lateral change ratios input from the longitudinal and lateral change ratio input means 1401 and extracting only low-frequency areas of the N orthogonal transformation blocks required for resolution transformation from before-transformation orthogonal transformation image memory 1402 for storing orthogonal transformation images before undergoing resolution transformation, third resolution transformation means 1404 for determining the number of orthogonal transformation blocks to be generated after resolution transformation, L, from the longitudinal and lateral change ratios input from the longitudinal and lateral change ratio input means 1401, executing resolution transformation from the N low-frequency orthogonal transformation blocks extracted by the low-frequency orthogonal transformation block extraction means 1403 to generate M orthogonal transformation blocks, and storing intermediate information generated in the resolution transformation process in temporary memory of intermediate data 1405, fourth resolution transformation means 1406 for determining the number of orthogonal transformation blocks to be generated after resolution transformation, L, from the longitudinal and lateral change ratios input from the longitudinal and lateral change ratio input means 1401 and generating L orthogonal transformation blocks from the intermediate information stored in the temporary memory of intermediate data 1405, and orthogonal transformation block storage means 1407 for storing the orthogonal transformation blocks generated by the third resolution transformation means 1404 and the fourth resolution transformation means 1406 in after-transformation orthogonal transformation image memory 1408 for storing orthogonal transformation images after undergoing resolution transformation.

If two pairs of longitudinal and lateral change ratios input from the longitudinal and lateral change ratio input means 1401 are represented as [rv1, rh1] and [rv2, rh2] (rv1, rv2, rh1, rh2=1/8, 1/4, 3/8, 1/2, 5/8, 3/4, 7/8), the resolution transformation apparatus can be used only if rv1>rv2 and rh1>rh2. The low-frequency orthogonal transformation block extraction means 1403 determines the number of orthogonal transformation blocks required for resolution transformation, N, and the low-frequency areas to be extracted. The determination method is as follows: Using the table in FIG. 3, the maximum number of orthogonal transformation blocks (V blocks in the longitudinal direction and H blocks in the lateral direction) responsive to the longitudinal and lateral change ratios of [rv1, rh1] and [rv2, rh2] and each extraction area (v pixels in the longitudinal direction and h pixels in the lateral direction) responsive to the longitudinal and lateral change ratios of [rv1, rh1] are found and the number of orthogonal transformation blocks required for resolution transformation, N=V*H, and the low-frequency area to be extracted, v×h, are determined. For example, to reduce to a half and reduce to a quarter in both longitudinal and lateral directions at the same time, [rv1, rh1]=[1/2, 1/2], [rv2, rh2]=[1/4, 1/4], V=4, H=4, v=4, and h=4. Thus, 4×4 low-frequency areas of N=4×4 (16) 8×8DCT blocks are extracted. The third resolution transformation means 1404 determines the number of orthogonal transformation blocks to be generated after resolution transformation using the change ratios of [rv1, rh1] input from the longitudinal and lateral change ratio input means 1401. The determination method of M is as follows: Using the table in FIG. 3, each ratio between the number of after-transformation orthogonal transformation blocks responsive to [rv1, rh1] and the number of orthogonal transformation blocks (number of after-transformation orthogonal transformation blocks/ number of orthogonal transformation blocks in longitudinal direction (V1), number of after-transformation orthogonal transformation blocks/ number of orthogonal transformation blocks in lateral direction (H1)) is found and M=V*V1×H*H1 is calculated. For example, to reduce to a half and reduce to a quarter in both longitudinal and lateral directions at the same time, V1=1/2 and H1=1/2, thus M=2×2 (four). The fourth resolution transformation means 1406 determines the number of orthogonal transformation blocks to be generated after resolution transformation, L, using the change ratios of [rv2, rh2] input from the longitudinal and lateral change ratio input means 1401.

The determination method of L is similar to the determination method of M.

Figure 15:
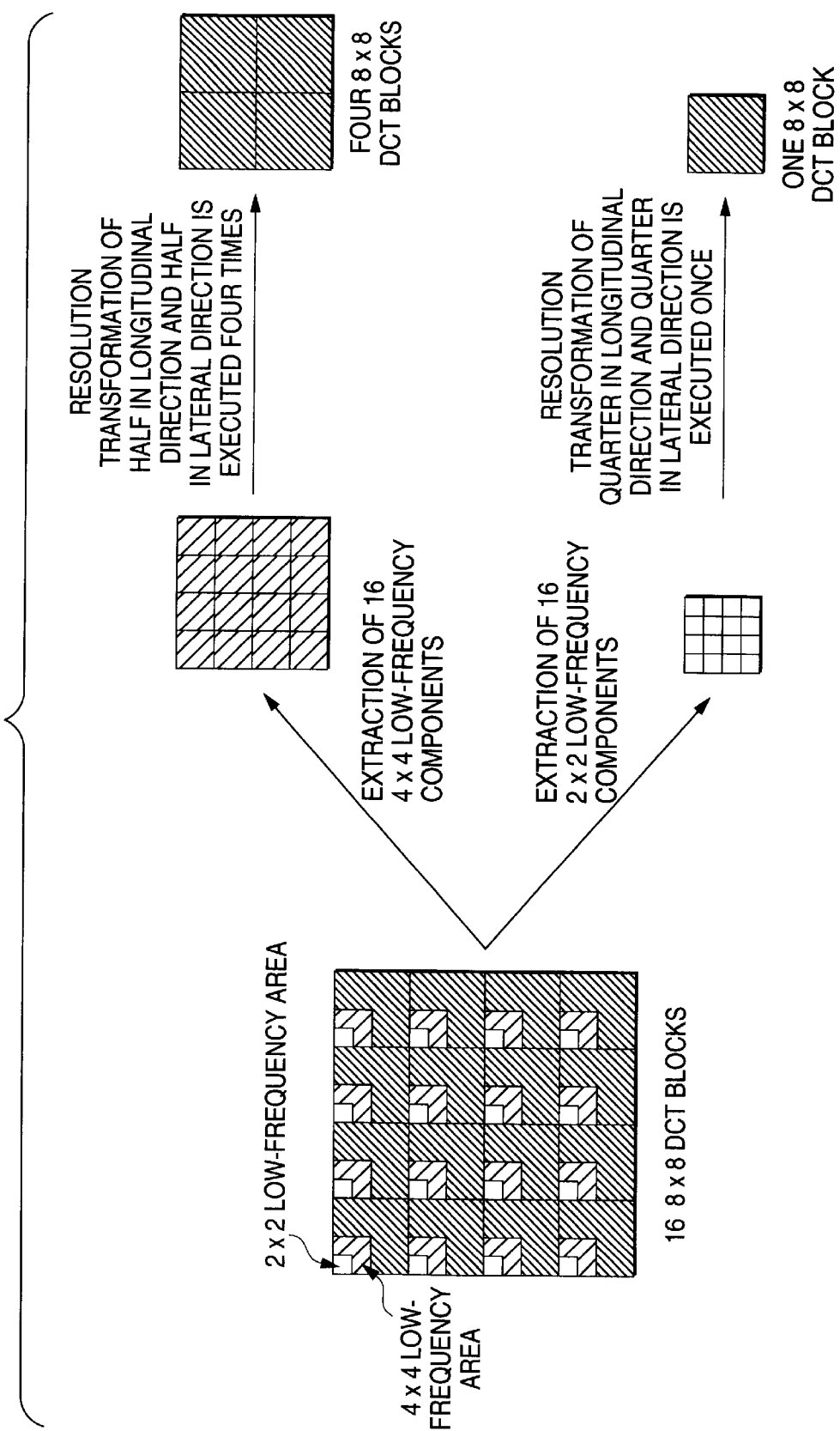
FIG. 15 is a drawing to describe processing of generating images with different resolutions separately.

A resolution transformation method using the temporary memory of intermediate data 1405 will be discussed by taking the case of reducing to a half in both longitudinal and lateral directions and reducing to a quarter in both longitudinal and lateral directions as an example. In the description to follow, DCT is used as orthogonal transformation. FIG. 15 shows the case where an image reduced to a half in both longitudinal and lateral directions and an image reduced to a quarter in both longitudinal and lateral directions are generated separately. To reduce to a half in both longitudinal and lateral directions, 4×4 low-frequency areas of 16 8×8DCT blocks are extracted and resolution transformation is executed from four 4×4 low-frequency areas to generate one 8×8DCT block. This resolution transformation is executed four times. To reduce to a quarter in both longitudinal and lateral directions, 2×2 low-frequency areas of 16 8×8DCT blocks are extracted and resolution transformation is executed from 16 2×2 low-frequency areas to generate one 8×8DCT block. In fact, reduction processing to a half in both longitudinal and lateral directions and reduction processing to a quarter in both longitudinal and lateral directions contain a large number of the same computations. For example, the computation of DC components of four 8×8DCT blocks generated after reduction to a half in both longitudinal and lateral directions is used in the computation process of DC component of the 8×8DCT block generated after reduction to a quarter in both longitudinal and lateral directions.

Therefore, it is effective to use the computation result of reduction to a half in both longitudinal and lateral directions in reduction processing to a quarter in both longitudinal and lateral directions, leading to speeding up computation processing. FIGS. 16A and 16B show the case where the intermediate data generated in the reduction process to a half in both longitudinal and lateral directions is used effectively for reduction processing to a quarter in both longitudinal and lateral directions. First, the low-frequency orthogonal transformation block extraction means 1403 extracts 4×4 low-frequency components of the N=16 orthogonal transformation blocks from the before-transformation orthogonal transformation image memory 1402. Next, the third resolution transformation means 1404 performs reduction processing to a half in both longitudinal and lateral directions four times using the 16 4×4 low-frequency components. If intermediate information required for reduction to a quarter in both longitudinal and lateral directions at the resolution transformation time, the information is stored in the temporary memory of intermediate data 1405. Two methods of storing the intermediate data are shown in FIGS. 16A and 16B.

(a) The 4×4 low-frequency components of four 8×8DCT blocks generated after reduction to a half in both longitudinal and lateral directions are stored as the intermediate data.

(b) The sum and difference information of the coefficients of 8×8DCT blocks that can be used for reducing to a quarter in both longitudinal and lateral directions is stored as the intermediate data. The sum and difference information of the coefficients of 8×8DCT blocks is, for example, A00 −C00, B00 −D00, and A00 +B00 −C00 −D00 to find Z10 in FIG. 7.

In the method (a), after reducing to a half in both longitudinal and lateral directions, again the fourth resolution transformation means 1406 performs reducing to a half in both longitudinal and lateral directions. The number of times a DTC4×4 base vector used in reducing to a half in both longitudinal and lateral directions becomes orthogonal to a DTC8×8 base vector is twice as large as the number of times a DTC2×2 base vector used in reducing to a quarter in both longitudinal and lateral directions becomes orthogonal to the DTC8×8 base vector. Thus, if the intermediate data after reduction to a half in both longitudinal and lateral directions is used to again reduce to a half in both longitudinal and lateral directions, higher-speed processing can be performed. The values of the 4×4 low-frequency components stored as the intermediate data are calculated from the 4×4 low-frequency areas of the former 16 8×8DCT blocks. Thus, if reduction to a half in both longitudinal and lateral directions is further executed, the coefficient values of 8×8DCT blocks after reduction contain the components of the 4×4 low-frequency areas of the former 16 8×8DCT blocks. For example, the values of Z01, Z10, and Z11 in FIG. 7 are calculated from the values of the 4×4 low-frequency areas of the former 8×8DCT blocks. Therefore, the image quality is improved by reducing to a half in both longitudinal and lateral directions again after reducing to a quarter in both longitudinal and lateral directions rather than extracting 2×2 low-frequency areas and reducing to a quarter in both longitudinal and lateral directions. A resolution conversion apparatus as shown in FIG. 17 can also accomplish simultaneous reducing to a half in both longitudinal and lateral directions and to a quarter in both longitudinal and lateral directions.

Figure 17:
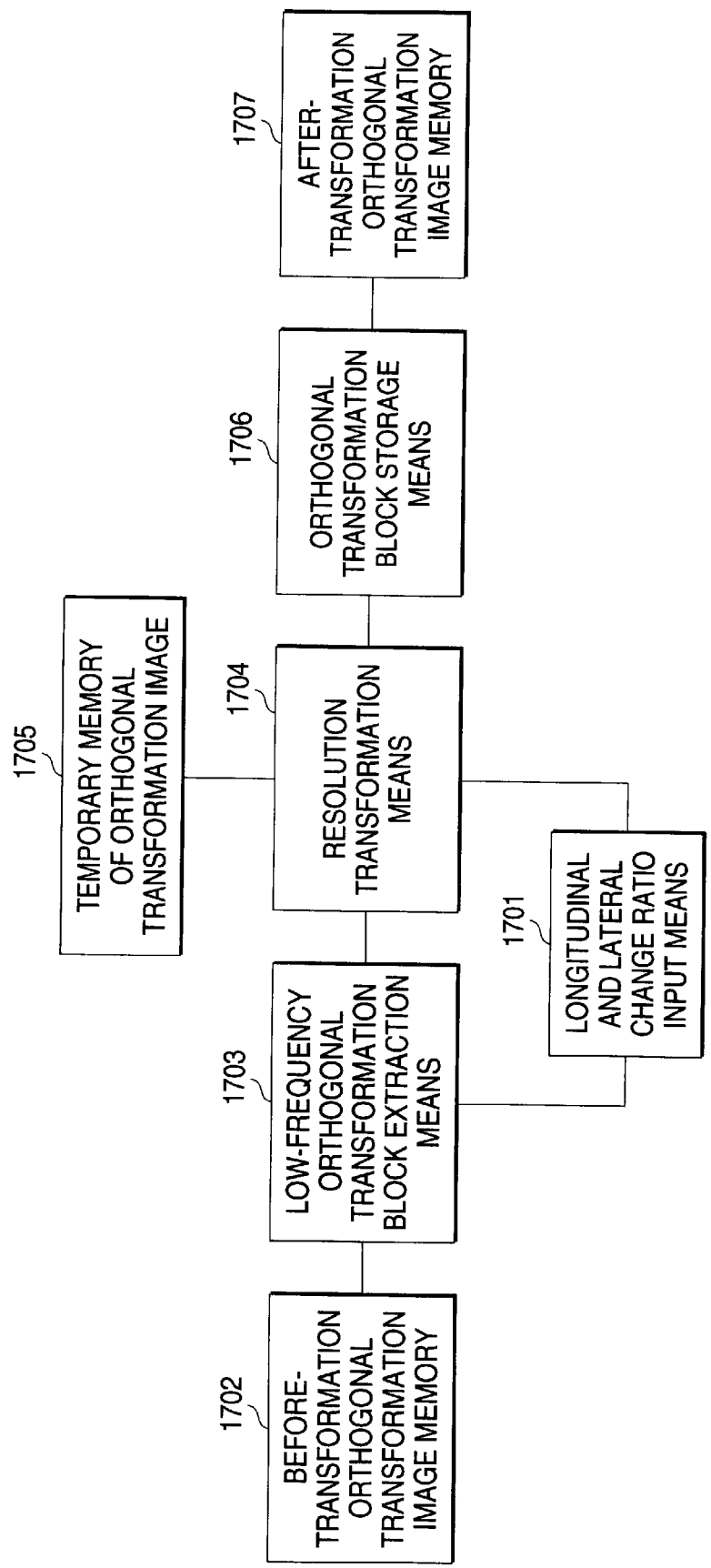
FIG. 17 is a block diagram to show the configuration of a resolution transformation apparatus in the third embodiment of the invention.

In FIG. 17, the resolution transformation apparatus comprises longitudinal and lateral change ratio input means 1701 for inputting the longitudinal and lateral change ratios of an image, low-frequency orthogonal transformation block extraction means 1703 for determining the number of orthogonal transformation blocks required for resolution transformation, N, from the longitudinal and lateral change ratios input from the longitudinal and lateral change ratio input means 1701 and extracting only low-frequency areas of the N orthogonal transformation blocks required for resolution transformation from before transformation orthogonal transformation image memory 1702 for storing orthogonal transformation images before undergoing resolution transformation, resolution transformation means 1704 for executing resolution transformation from the N low-frequency orthogonal transformation blocks extracted by the low-frequency orthogonal transformation block extraction means 1703 to generate M orthogonal transformation blocks and at the same time, temporarily storing low-frequency areas of the M orthogonal transformation blocks after undergoing resolution transformation in temporary memory of orthogonal transformation image 1705 and again executing resolution transformation in the same longitudinal and lateral change ratios from the temporary memory of orthogonal transformation image 1705, and orthogonal transformation block storage means 1706 for storing the orthogonal transformation image generated by the resolution transformation means 1704 in after-transformation orthogonal transformation image memory 1707.

In this case, a plurality of resolution transformations can be accomplished only with one resolution transformation expression.

As the method (a), the case of reducing to a half in both longitudinal and lateral directions and reducing to a quarter in both longitudinal and lateral directions has been described; the method (a) can also be used if [rv1, rv2] and [rh1, rh2] take the value of [1/4, 1/8], [1/2, 1/8], [1/2, 1/4], [1/2, 3/8]. For example, to reduce to a half in both longitudinal and lateral directions and reduce to three-eighths in both longitudinal and lateral directions, if 6×6 low-frequency area of 8×8DCT block after reduction to a half is used further to reduce to three-fourths in both longitudinal and lateral directions after reduction to a half in both longitudinal and lateral directions, reduction to three-eighths in both longitudinal and lateral directions can be executed.

In the method (b), a part of computation processing performed at the reducing time to a quarter in both longitudinal and lateral directions is performed at the reducing time to a half in both longitudinal and lateral directions, whereby it is made possible to speed up reducing to a quarter in both longitudinal and lateral directions as with the method (a). The image quality can also be improved, as with the method (a), by effectively using also the computation result of the coefficients of 4×4 low-frequency areas other than 2×2 low-frequency areas normally unused for reducing to a quarter in both longitudinal and lateral directions. The method (b) can be used only if rv1, rv2, rh1, and rh2 take values of (1/8, 1/4, 3/8, 1/2, 5/8, 3/4, 7/8) satisfying rv1>rv2 and rh1>rh2.

Figure 18:
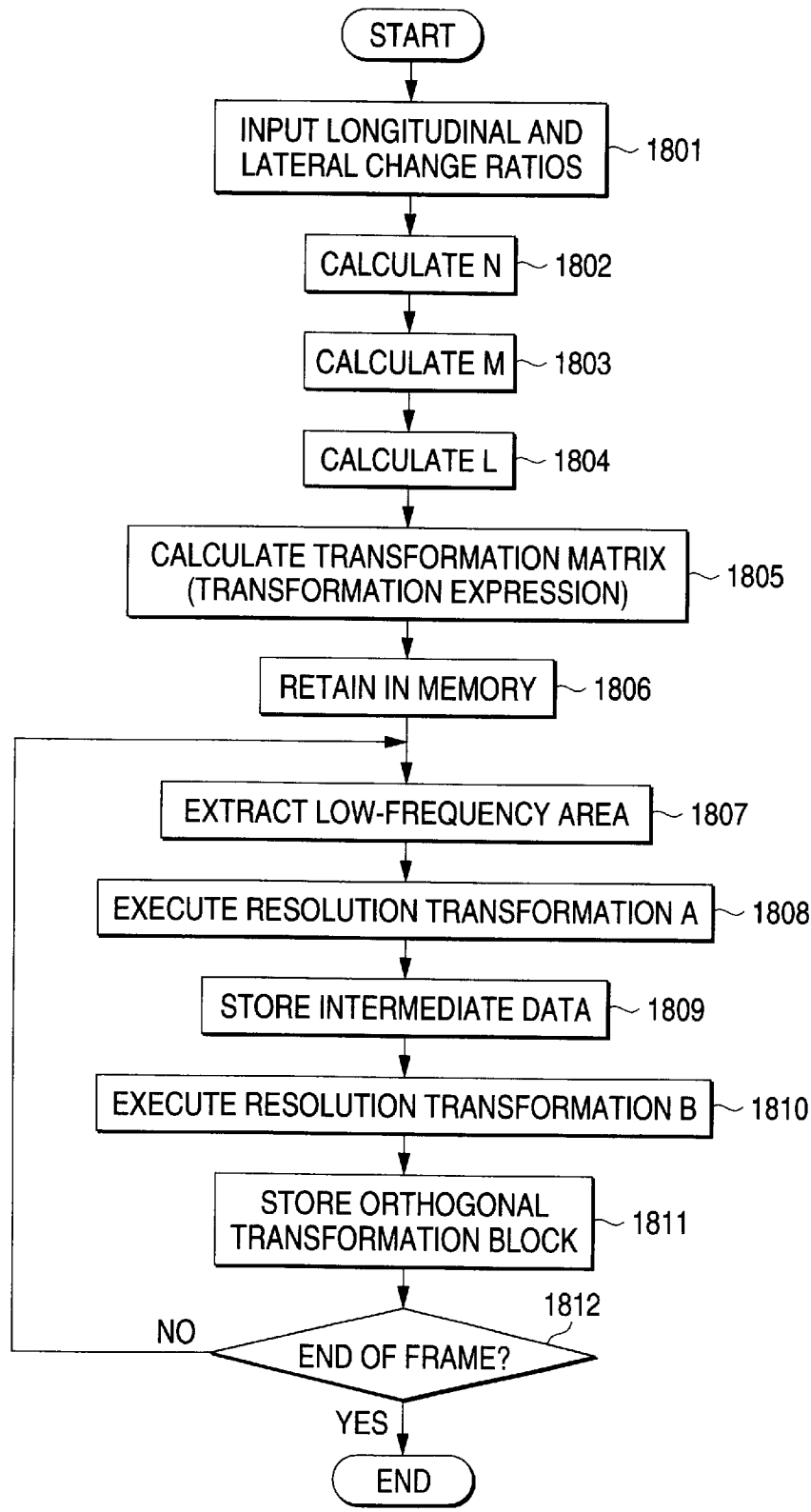
FIG. 18 is a flowchart to show the operation of the resolution transformation apparatus in the third embodiment of the invention.

FIG. 18 is a flowchart to show a processing flow of the resolution transformation apparatus in frame units. The operation is as follows:

Step 1801: Longitudinal and lateral change ratios are input from the longitudinal and lateral change ratio input means 1401.

Step 1802: The low-frequency orthogonal transformation block extraction means 1403 calculates the number of orthogonal transformation blocks required for resolution transformation, N, using the longitudinal and lateral change ratios and the table in FIG. 3.

Step 1803: The third resolution transformation means 1404 calculates the number of orthogonal transformation blocks to be generated after resolution transformation, M, using the longitudinal and lateral change ratios and the table in FIG. 3.

Step 1804: The fourth resolution transformation means 1406 calculates the number of orthogonal transformation blocks to be generated after resolution transformation, L, using the longitudinal and lateral change ratios and the table in FIG. 3.

Step 1805: A transformation matrix or a transformation expression of resolution transformation used with the third resolution transformation means 1404 and the fourth resolution transformation means 1406 is calculated.

Step 1806: The transformation matrix or the transformation expression calculated at step 1805 is retained in temporary memory.

Step 1807: The low-frequency orthogonal transformation block extraction means 1403 extracts low-frequency orthogonal transformation blocks of N low-frequency orthogonal transformation blocks from the before-transformation orthogonal transformation image memory 1402.

Step 1808: The third resolution transformation means 1404 generates M orthogonal transformation blocks from low-frequency orthogonal transformation blocks of the N orthogonal transformation blocks using the transformation matrix or the transformation expression retained at step 1806.

Step 1809: The third resolution transformation means 1404 stores the intermediate data that can be used with the fourth resolution transformation means 1406 in the temporary memory of intermediate information 1405.

Step 1810: The fourth resolution transformation means 1406 performs computation of resolution transformation using the transformation matrix or the transformation expression retained at step 1806 and the intermediate data stored at step 1809 and generates L orthogonal transformation blocks.

Step 1811: The orthogonal transformation block storage means 1407 stores the M orthogonal transformation blocks generated at step 1808 and the L orthogonal transformation blocks generated at step 1810 in the after-transformation orthogonal transformation image memory 1408.

Step 1812: Whether or not resolution conversion has been executed to the end of the frame image is determined. If the resolution conversion has been executed at a midpoint in the frame image, control is returned to step 1807. If the resolution conversion has been executed to the end of the frame image, the processing is terminated.

As described above, to generate orthogonal transformation blocks with a plurality of resolutions at the same time, the resolution transformation apparatus can improve resolution transformation processing and the image quality after resolution transformation by using the intermediate information data generated for one resolution transformation processing for another resolution transformation processing; the resolution transformation apparatus provides a large practical advantage. In the description, the case of reducing to a half in both longitudinal and lateral directions and reducing to a quarter in both longitudinal and lateral directions is taken as an example; however, similar advantages can also be provided if another change ratio of 1/8, 1/4, 3/8, 1/2, 5/8, 3/4, or 7/8 is used. In the description, DCT8×8 is used as orthogonal transformation; however, if orthogonal transformation of any other two-dimensional DCT, one-dimensional DCT, wavelet transformation, etc., is used, similar advantages can also be provided.

Fourth Embodiment

In a fourth embodiment of the invention, an apparatus for also executing requantization at the same time in a resolution transformation process, an apparatus for generating orthogonal transformation blocks with a plurality of resolutions from a plurality of orthogonal transformation blocks having the same quantization value at the same time containing requantization, and an apparatus for executing resolution transformation containing requantization at high speed using nonvolatile memory will be discussed.

Figure 19:
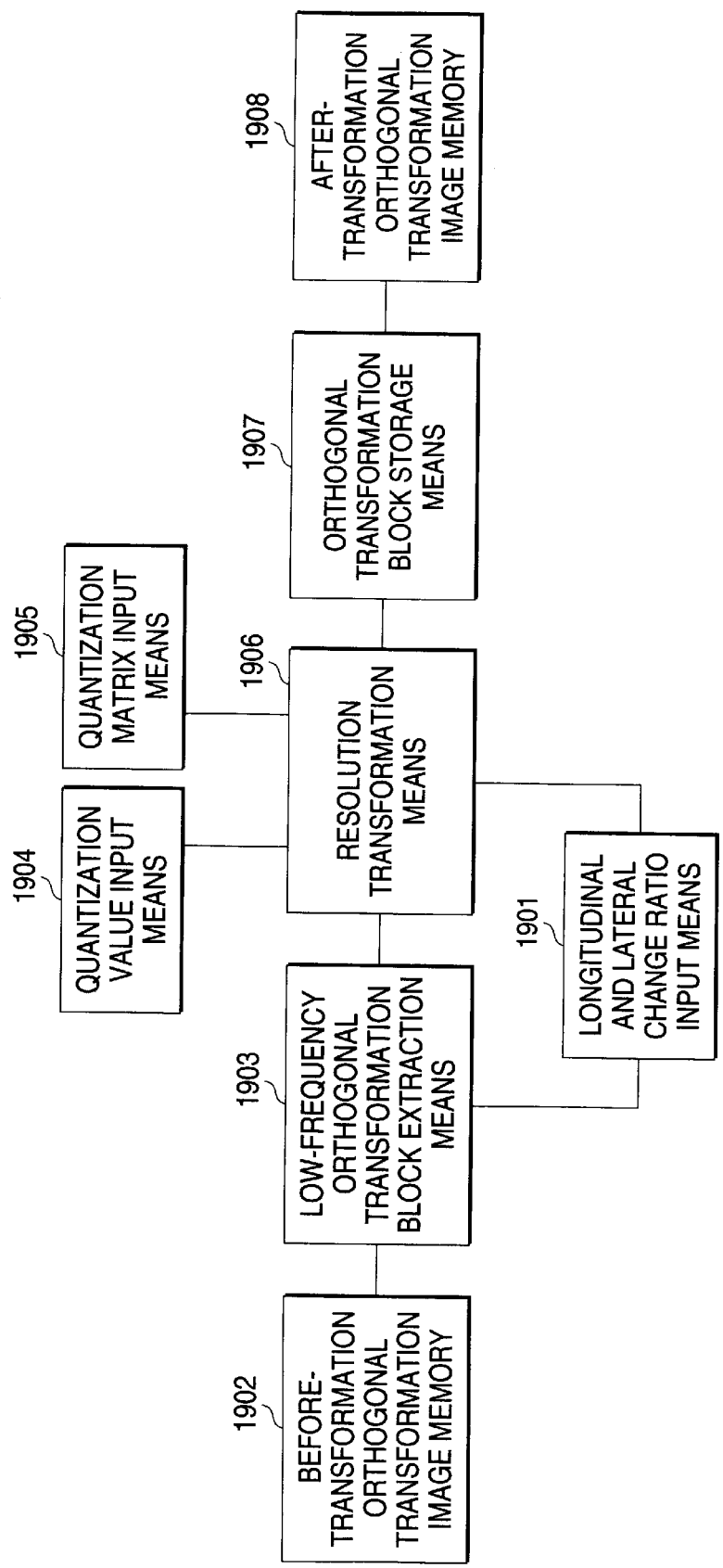
FIG. 19 is a block diagram to show the configuration of a resolution transformation apparatus in a fourth embodiment of the invention.

In FIG. 19, the resolution transformation apparatus comprises longitudinal and lateral change ratio input means 1901 for inputting the longitudinal and lateral change ratios of an image, low-frequency orthogonal transformation block extraction means 1903 for determining the number of orthogonal transformation blocks required for resolution transformation, N, from the longitudinal and lateral change ratios input from the longitudinal and lateral change ratio input means 1901 and extracting only low-frequency areas of the N orthogonal transformation blocks required for resolution transformation from before-transformation orthogonal transformation image memory 1902 for storing orthogonal transformation images before undergoing resolution transformation, quantization value input means 1904 for inputting quantization values of orthogonal transformation blocks before and after resolution transformation, quantization matrix input means 1905 for inputting a quantization matrix of orthogonal transformation blocks before and after resolution transformation, resolution transformation means 1906 for determining the number of orthogonal transformation blocks to be generated after resolution transformation, M, from the longitudinal and lateral change ratios input from the longitudinal and lateral change ratio input means 1901 and executing resolution transformation and generating M orthogonal transformation blocks while also executing requantization at the same time using the N low-frequency orthogonal transformation blocks extracted by the low-frequency orthogonal transformation block extraction means 1903, the quantization values input from the quantization value input means 1904, and the quantization matrix input from the quantization matrix input means 1905, and orthogonal transformation block storage means 1907 for storing the M orthogonal transformation blocks generated by the resolution transformation means 1906 in after-transformation orthogonal transformation image memory 1908 for storing orthogonal transformation images after undergoing resolution transformation. The numbers N and M can be calculated in similar manners to those in the first embodiment.

Figure 20:
FIG. 20 is a drawing to describe resolution transformation containing quantization and inverse quantization.

If the orthogonal transformation blocks stored in the before-transformation orthogonal transformation image memory 1902 and the after-transformation orthogonal transformation image memory 1908 are quantized orthogonal transformation blocks, normally, as shown in FIG. 20, it is necessary to inversely quantize the orthogonal transformation block in the before-transformation orthogonal transformation image memory 1902 before executing resolution transformation and quantize the orthogonal transformation block generated in resolution transformation and store the block in the after-transformation orthogonal transformation image memory 1908 after the resolution transformation. In the description to follow, DCT is used as orthogonal transformation.

Figure 21:
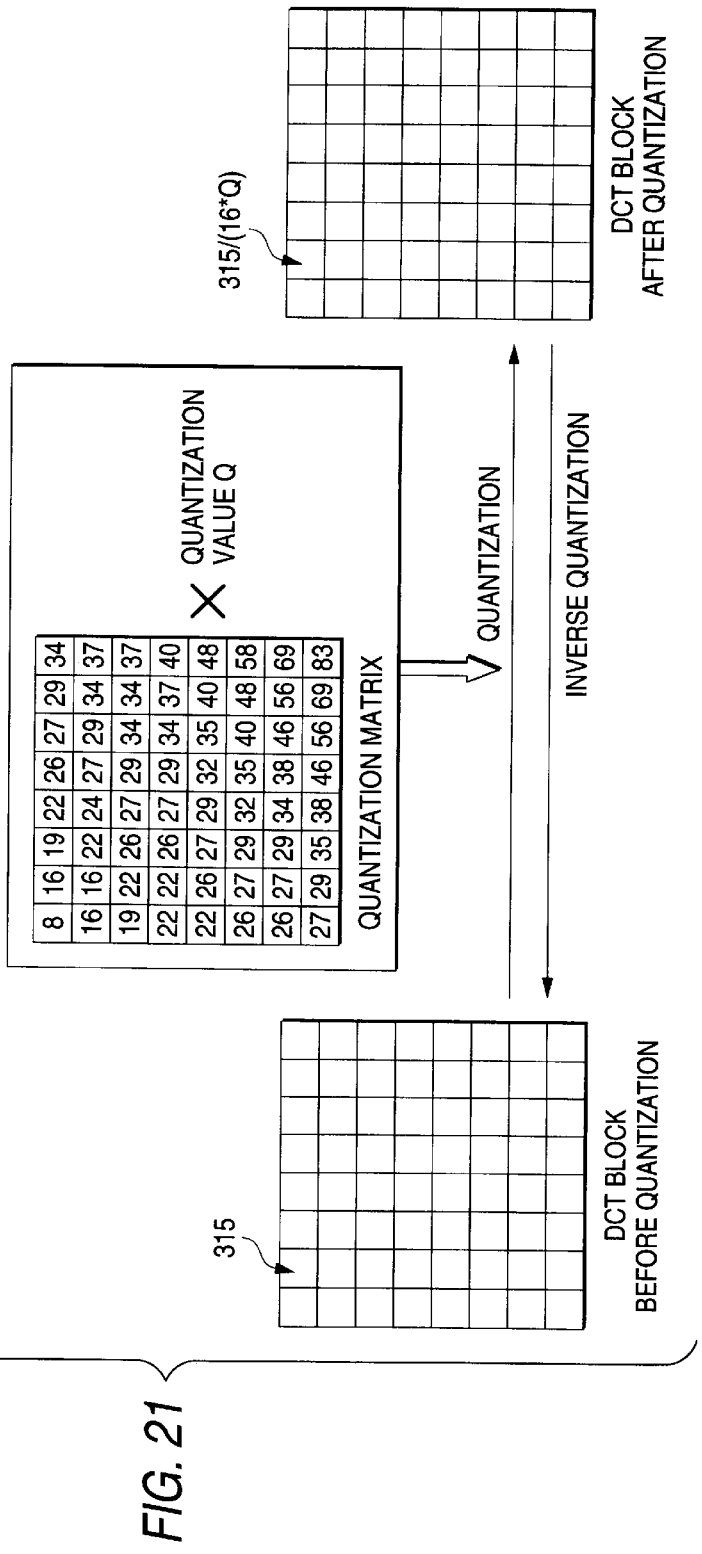
FIG. 21 is a drawing to describe the way quantization and inverse quantization are executed.

FIG. 21 shows the way quantization and inverse quantization used in MPEG are executed. For DC components (direct current components, for example, A00, B00, C00, D00 in FIG. 7), a DCT block is quantized by dividing the coefficient of a DC component by one constant (for example, 8); for AC components (alternating current components), a DCT block is quantized by dividing each coefficient of the DCT block by the corresponding coefficient in the quantization matrix multiplied by a quantization value. For DC components, inverse quantization is executed by multiplying the coefficient of a DC component quantized by one constant (for example, 8); for AC components (alternating current components), inverse quantization is executed by multiplying each coefficient of DCT block by the corresponding coefficient in the quantization matrix and a quantization value. In fact, in quantization and inverse quantization of AC components, constants are also used in addition to the quantization matrix and the quantization value; however, in the description to follow, the constants are omitted.

To reduce to a half in both longitudinal and lateral directions, four DCT blocks are inversely quantized and one DCT block is quantized to calculate one quantized DCT block after reduction. Consequently, it is necessary to perform a total of 635 computations of multiplication and division (five computations for quantization and inverse quantization of DC component and 630 computations for quantization and inverse quantization of AC component (five DCT blocks*63 coefficients*two multiplication and division computations)). The apparatus in the embodiment is intended for decreasing the above-mentioned computation amount by performing inverse quantization plus quantization, which will be hereinafter referred to as requantization, in a resolution transformation process.

Figure 29:
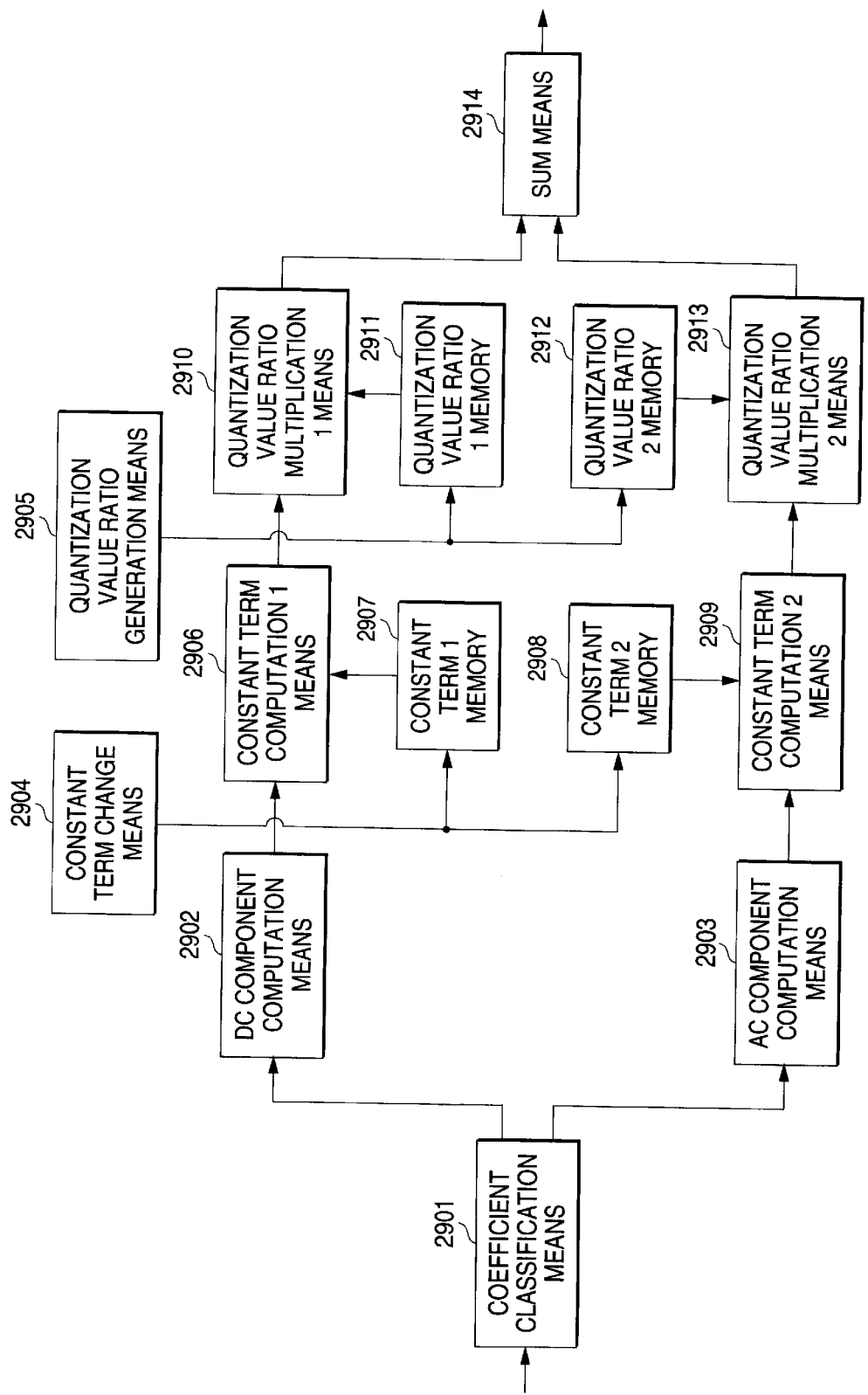
FIG. 29 is a block diagram to show the configuration for executing requantization in the resolution transformation process in the fourth embodiment of the invention.

To perform requantization in the resolution transformation process, the mechanism capable of absorbing the difference between the DC and AC component quantization methods becomes necessary. FIG. 29 shows the mechanism for calculating while quantizing each coefficient (for example, Z01, Z10, Z11 in FIG. 7) after reduction to reduce to a half in both longitudinal and lateral directions. The mechanism in FIG. 29 can be applied to quantization of assignment of one quantization value in two×two DCT block units like quantization of intensity component in MPEG.

Coefficient classification means 2901 classifies the components of low-frequency areas extracted by the low-frequency orthogonal transformation block extraction means 1903 into AC components and DC components. DC component computation means 2902 performs computation of A00+B00−C00−D00, for example, to calculate Z10 n FIG. 7. AC component computation means 2903 performs computation of A10+B10+C10+D10, A20+B20−C20−D20, etc., for example, to calculate Z10 in FIG. 7. Constant term change means 2904 multiplies a constant term by a quantization matrix coefficient ratio for executing requantization using before-and after-resolution-transformation quantization matrixes input from the quantization matrix input means 1905, and stores the result in constant term 1 memory 2907 and constant term 2 memory 2908.

The constant term denotes a constant (for example, $4\alpha 1A0B0$) multiplied after computation of the sum (difference) of the coefficients on the same row, the same column of four DCT blocks before resolution transformation shown in FIG. 7. The quantization matrix coefficient ratio denotes the coefficient ratio between the coefficient of quantization matrix by which the coefficients on the same row, the same column of four DCT blocks before resolution transformation are multiplied for executing inverse quantization and the coefficient of the quantization matrix by which the coefficient after resolution transformation is divided for executing quantization.

For example, to calculate Z10 in FIG. 7, the quantization matrix coefficient ratio for A00+B00−C00−D00 becomes 8/16 (assuming that the constant of inverse quantization of DC component is 8) and the quantization matrix coefficient ratio for A10+B10+C10+D10 becomes 16/16. The constant term concerning the DC component before resolution transformation is stored in the constant term 1 memory 2907 and the constant term concerning the AC component is stored in the constant term 2 memory 2908.

Constant term computation 1 means 2906 extracts the corresponding constant term from the constant term 1 memory 2907 and multiplies the computation result of the DC component computation means 2902 by the constant term. Constant term computation 2 means 2909 extracts the corresponding constant term from the constant term 2 memory 2908 and multiplies a plurality of computation results of the AC component computation means 2903 (A10+B10+C10+D10 and A20+B20−C20−D20, for example, to calculate Z10 in FIG. 7) by the constant term and finds the sum of the computation results. Quantization value ratio generation means 2905 uses the quantization values before and after resolution transformation, input from the quantization value input means 1904 to generate a quantization value ratio for executing requantization and stores the quantization value ratio in quantization value ratio 1 memory 2911 and quantization value ratio 2 memory 2912.

One/quantization value after resolution transformation is stored in the quantization value ratio 1 memory 2911 and quantization value before resolution transformation/ quantization value after resolution transformation is stored in the quantization value ratio 2 memory 2912. Quantization value ratio multiplication 1 means 2910 multiplies the computation result of the constant term computation 1 means 2906 by the quantization value ratio in the quantization value ratio 1 memory 2911. Quantization value ratio multiplication 2 means 2913 multiplies the computation result of the constant term computation 2 means 2909 by the quantization value ratio in the quantization value ratio 2 memory 2912. Sum means 2914 finds the sum of the computation results of the quantization value ratio multiplication 1 means 2910 and the quantization value ratio multiplication 2 means 2913 and calculates each coefficient after resolution transformation.

Figure 22A:
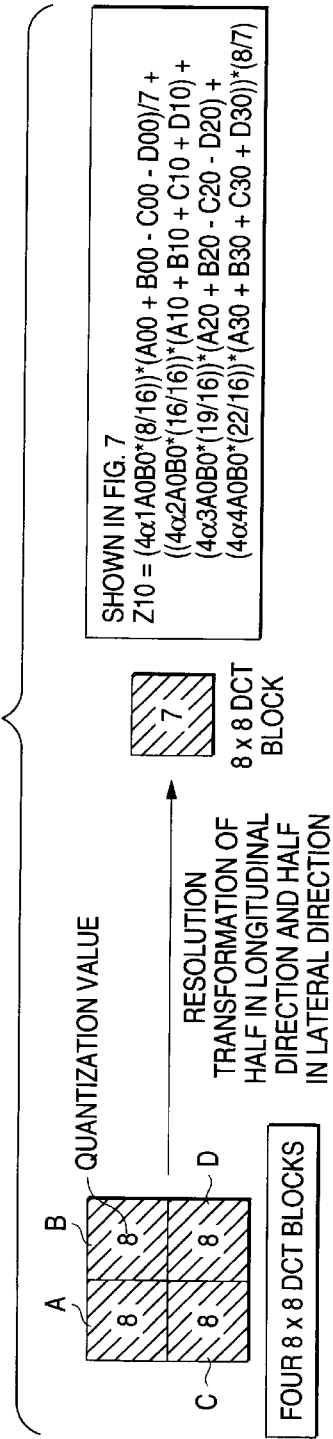
FIGS. 22A & B is a drawing to describe requantization in a resolution transformation process in the fourth embodiment of the invention.

FIG. 22A shows a transformation expression of requantization of Z10 to reduce to a half in both longitudinal and lateral directions from two×two 8×8DCT blocks each with a quantization value of 8 and generate one 8×8DCT block quantized with a quantization value of 7; constant term is multiplied by quantization matrix coefficient ratio and DC component computation portion and AC component computation portion before resolution transformation are multiplied by quantization value ratio.

Since one quantization matrix is determined in n frames (n: Natural number) in MPGE, the quantization matrix coefficient ratio may be calculated and the constant term 1 memory 2907 and the constant term 2 memory 2908 may be changed only when the quantization matrix is changed. Therefore, requantization in the resolution transformation process becomes almost equal to computation only on quantization value ratio. Consequently, processing can be performed only by 0 computations (the quantization value ratio becomes 1) to calculate the DC component after resolution transformation and 189 computations (63 coefficients*three multiplication and division computations) to calculate the AC component after resolution transformation. Further, if the quantization values before and after resolution transformation are made the same, processing can be performed only by 63 computations (63 coefficients*one division) to calculate the AC component after resolution transformation.

Figure 22B:
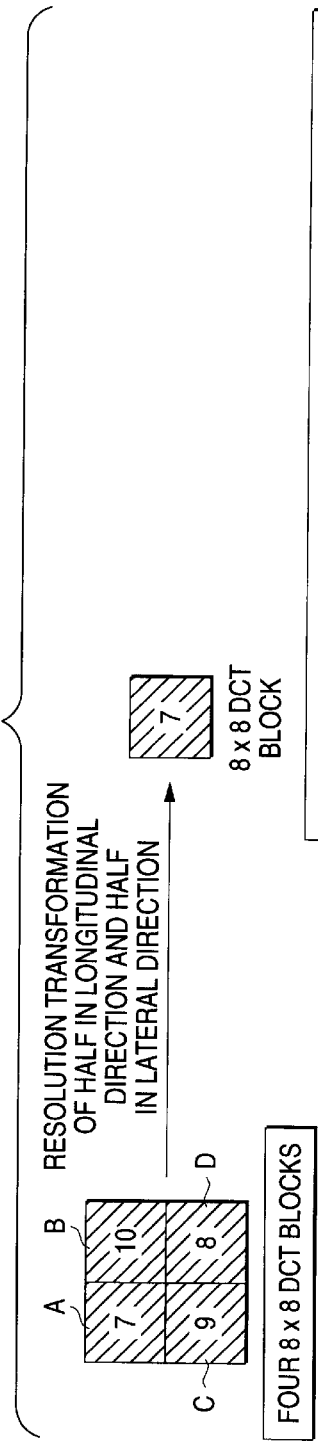

To execute requantization of color difference component in MPEG, reducing to a half in both longitudinal and lateral directions is performed from four 8×8DCT blocks different in quantization value and one 8×8DCT block quantized with a quantization value of 7 is generated, as shown in FIG. 22B. In this case, requantization can be accomplished in the resolution transformation process if the expression of calculating Z10 in FIG. 7 is used to multiply quantization matrix coefficient ratio and quantization value ratio of DC component computation portion before resolution transformation as in FIG. 22A and multiply AC component computation portion before resolution transformation and coefficient of DCT block used in the resolution transformation process by quantization value ratio. Consequently, processing of multiplying the AC component of DCT block before resolution transformation by the quantization value ratio can be performed by executing 120 computations (15 coefficients*four DCT blocks*two multiplication and division computations) and 63 computations (63 coefficients*one division) to calculate the AC component after resolution transformation, namely, a total of 183 computations.

To reduce to a quarter in both longitudinal and lateral directions concerning the intensity component in MPEG, four quantization values are assigned to four×four DCT blocks. Using FIGS. 22A and 22B, higher-speed processing can be carried out as compared with the case where inverse quantization is executed for 16 8×8DCT blocks before resolution transformation and quantization is executed for the 8×8DCT block after resolution transformation.

To reduce to a quarter in both longitudinal and lateral directions concerning the color difference component in MPEG, 16 quantization values are assigned to four×four DCT blocks. Using FIG. 22B, likewise higher-speed processing can be carried out. Therefore, the resolution transformation apparatus can decrease the computation amounts of the normal quantization and inverse quantization by also performing requantization at the same time in the resolution transformation process.

Figure 23:
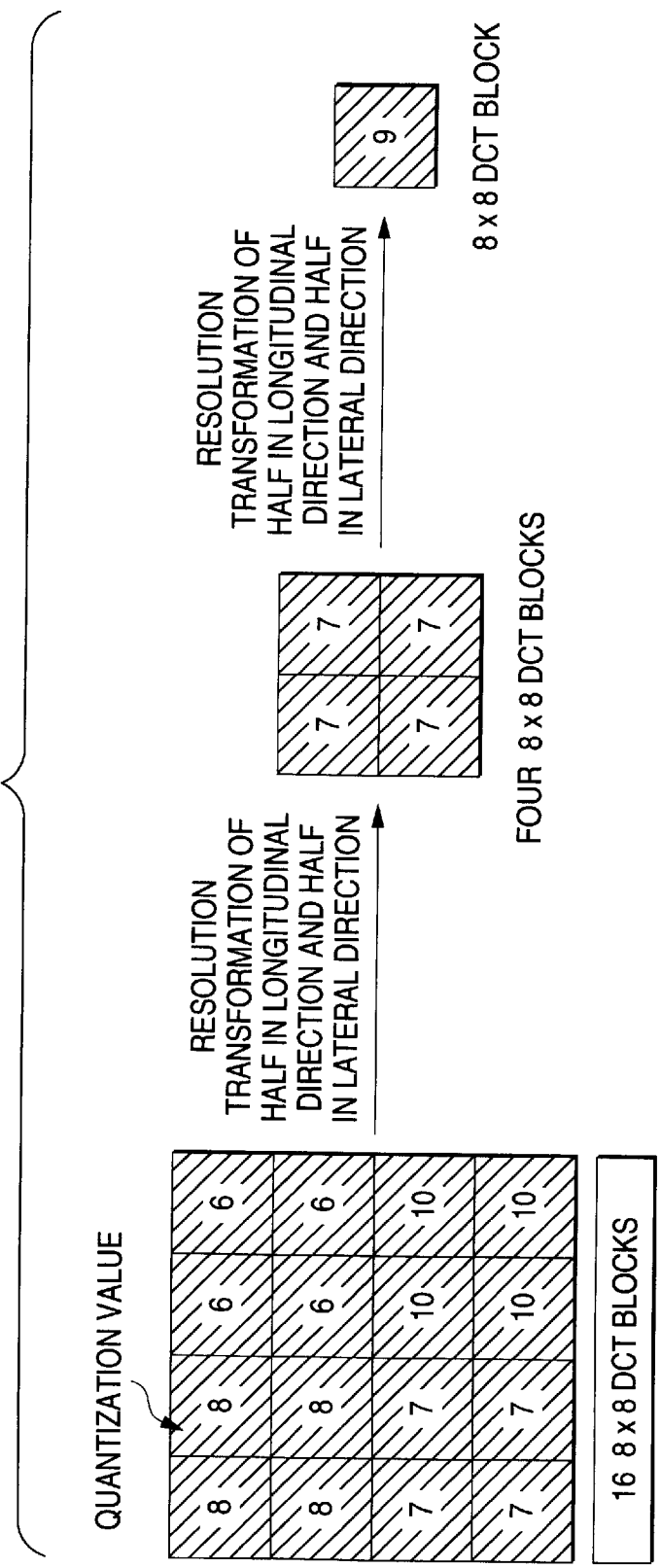
FIG. 23 is a drawing to describe requantization for generating a plurality of images different in resolution at the same time in the fourth embodiment of the invention.

To assign one quantization value to 2×2 four orthogonal transformation blocks as in MPEG and reduce an image to a half in both longitudinal and lateral directions and a quarter in both longitudinal and lateral directions at the same time, the computation amount of requantization can be decreased by adopting a method as shown in FIG. 23.

First, 16 8×8DCT blocks are reduced to a half in both longitudinal and lateral directions in the method in FIG. 22A. In MPEG, the quantization values of the four 8×8DCT blocks after reduction to a half in both longitudinal and lateral directions are the same. Then, in the method in FIG. 22A, the four 8×8DCT blocks are reduced to a half in both longitudinal and lateral directions to generate one 8×8DCT block. Since the quantization values of the four 8×8DCT blocks after reduction to a half in both longitudinal and lateral directions are the same, to again reduce to a half in both longitudinal and lateral directions, requantization can also be executed in the method in FIG. 22A and processing can be performed at higher speed than processing of directly reducing to a quarter in both longitudinal and lateral directions.

Figure 24:
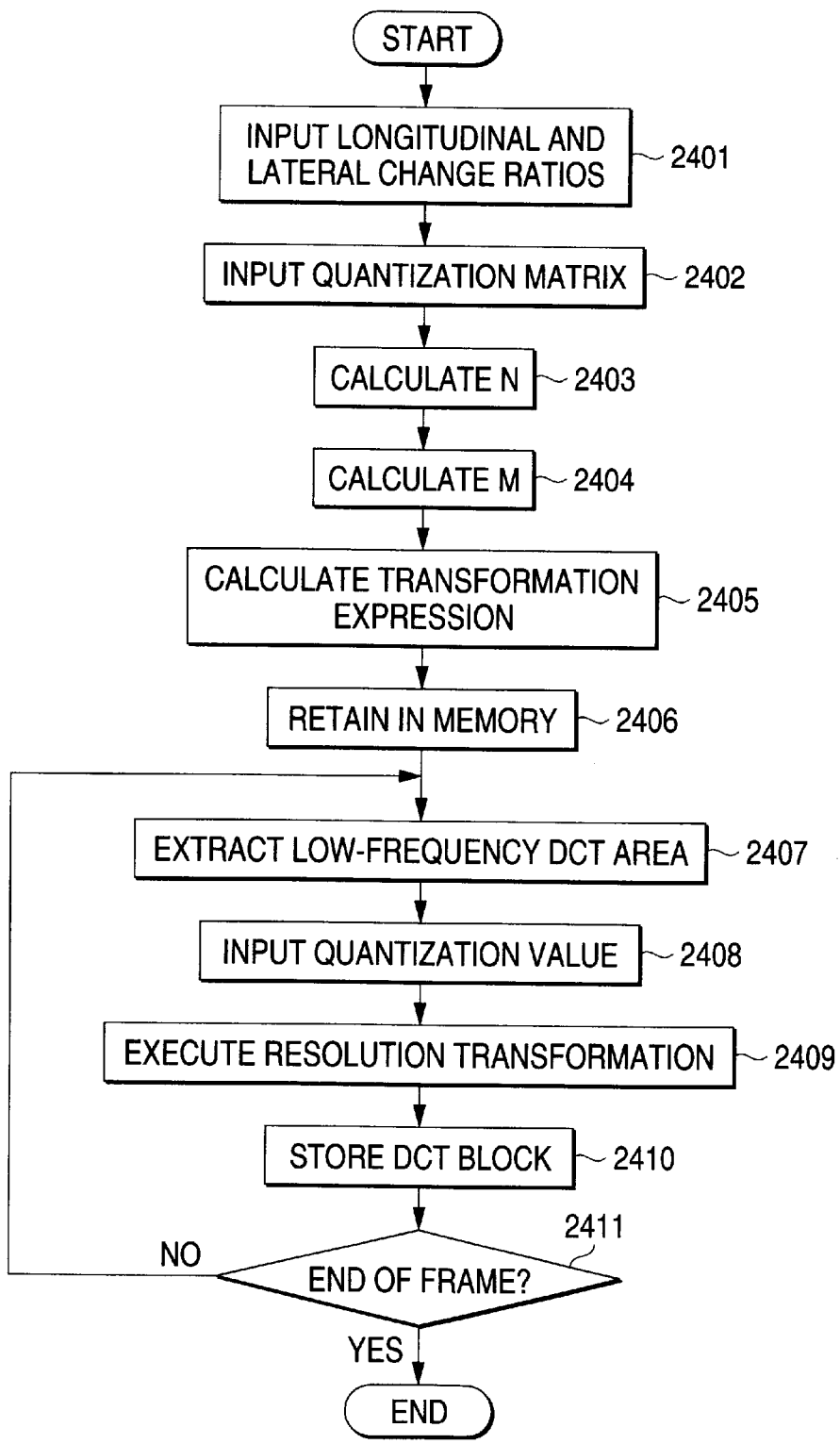
FIG. 24 is a flowchart to show the operation of the resolution transformation apparatus in the fourth embodiment of the invention.
Figure 25:
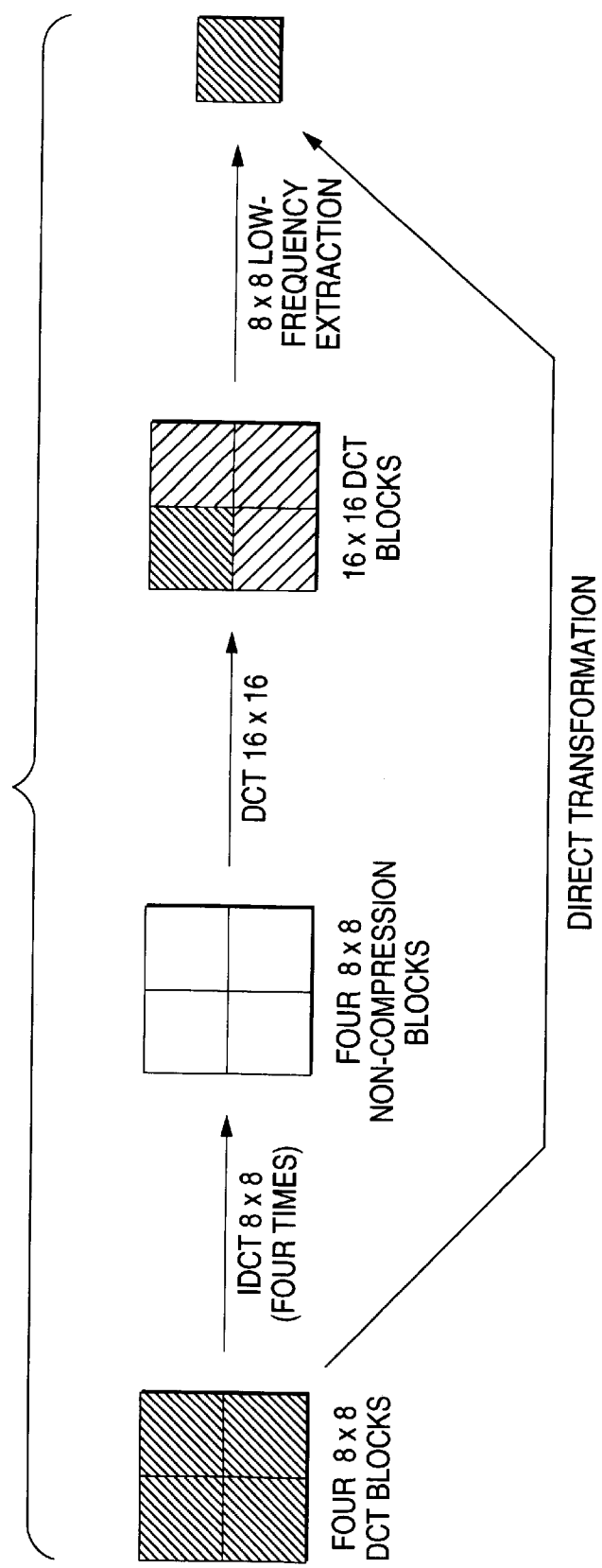
FIG. 25 is a drawing to describe resolution transformation processing in a related art.

FIG. 24 is a flowchart to show a processing flow of the resolution transformation apparatus in frame units. The operation is as follows:

Step 2401: Longitudinal and lateral change ratios are input from the longitudinal and lateral change ratio input means 1901.

Step 2402: A quantization matrix is input from the quantization matrix input means 1905. Step 2403: The low-frequency orthogonal transformation block extraction means 1903 calculates the number of orthogonal transformation blocks required for resolution transformation, N, using the longitudinal and lateral change ratios and the table in FIG. 3.

Step 2404: The resolution transformation means 1906 calculates the number of orthogonal transformation blocks to be generated after resolution transformation, M, using the longitudinal and lateral change ratios and the table in FIG. 3.

Step 2405: The resolution transformation means 1906 calculates a resolution transformation expression in response to the longitudinal and lateral change ratios and multiplies the constant term of the transformation expression by the corresponding quantization matrix coefficient ratio to calculate a new constant term.

Step 2406: The transformation expression containing the new constant term calculated at step 2405 is retained in temporary memory.

Step 2407: The low-frequency orthogonal transformation block extraction means 1903 extracts low-frequency orthogonal transformation blocks of N orthogonal transformation blocks from the before-transformation orthogonal transformation image memory 1902.

Step 2408: The quantization values of the orthogonal transformation blocks before and after resolution transformation are input from the quantization value input means 1904. Step 2409: The resolution transformation means 1906 executes resolution transformation while performing requantization from the low-frequency orthogonal transformation blocks of the N orthogonal transformation blocks to M orthogonal transformation blocks using the transformation expression retained in the temporary memory at step 2406 and the quantization value input at step 2408.

Step 2410: The orthogonal transformation block storage means 1907 stores the M generated orthogonal transformation blocks in the after-transformation orthogonal transformation image memory 1908.

Step 2411: Whether or not resolution conversion has been executed to the end of the frame image is determined. If the resolution conversion has been executed at a midpoint in the frame image, control is returned to step 2407. If the resolution conversion has been executed to the end of the frame image, the processing is terminated.

Steps 2405 and 2406 are made unnecessary by providing nonvolatile memory previously storing constant terms of transformation expressions responsive to all longitudinal and lateral change ratios multiplied by the coefficient ratio of a default quantization matrix, and the computation amount of the resolution transformation can be decreased. The default quantization matrixes refer to frequently used quantization matrixes containing quantization matrixes generally used in MPEG.

As described above, the resolution transformation apparatus inputs the quantization values of the orthogonal transformation blocks before and after resolution transformation and quantization matrix and also performs requantization at the same time in the resolution transformation process, whereby the whole computation amount of the resolution transformation also containing quantization can be decreased and the resolution transformation apparatus provides a large practical advantage.

To assign one quantization value to 2×2 four orthogonal transformation blocks as in MPEG and generate a plurality of images different in resolution at the same time, the intermediate information data after quantization generated for one resolution transformation processing is used for another resolution transformation processing, whereby the whole computation amount of the resolution transformation also containing quantization can be decreased and the resolution transformation apparatus provides a large practical advantage.

The resolution transformation expressions multiplied by the coefficient ratios of quantization matrixes corresponding to all longitudinal and lateral change ratios are stored in nonvolatile memory, whereby processing of generating each transformation matrix of resolution transformation containing quantization in response to the longitudinal and lateral change ratios can be skipped, thus the resolution transformation apparatus provides a large practical advantage.

In the description, the case of reducing a half in both longitudinal and lateral directions and a quarter in both longitudinal and lateral directions is taken as an example; however, if the longitudinal and lateral change ratios of 1/8, 1/4, 3/8, 1/2, 5/8, 3/4, and 7/8 are used, similar advantages can also be provided. In the description, DCT8×8 is used as orthogonal transformation; however, if orthogonal transformation of any other two-dimensional DCT, one-dimensional DCT, wavelet transformation, etc., is used, similar advantages can also be provided.

As described above, in a first aspect of the invention, only low-frequency areas of orthogonal transformation blocks required for resolution transformation are extracted and resolution transformation processing is performed, whereby the advantage of suppressing an increase in the computation amount for resolution transformation in response to the longitudinal and lateral change ratios can be provided.

In a second aspect of the invention, the transformation matrixes or transformation expressions corresponding to all longitudinal and lateral change ratios are previously stored in nonvolatile memory, whereby the advantage of being capable of decreasing processing of generating each transformation matrix or transformation expression of resolution transformation in response to the longitudinal and lateral change ratios can be provided.

In a third aspect of the invention, if an image made up of one-dimensional orthogonal transformation blocks in a lateral direction, resolution transformation of averaging processing or thinning-out processing among orthogonal transformation blocks is performed in a longitudinal direction, then resolution transformation in orthogonal transformation block in the lateral direction is executed, whereby the advantage of being capable of executing resolution transformation of one-dimensional orthogonal transformation blocks in two-dimensional directions of longitudinal and lateral directions can be provided.

In a fourth aspect of the invention, in one-dimensional orthogonal transformation, the even-numbered'th and odd-numbered'th coefficients of the orthogonal transformation block after resolution transformation are calculated using the nature of orthogonal transformation, and in two-dimensional orthogonal transformation, the coefficients on (even-numbered rows, even-numbered columns), (even-numbered rows, odd-numbered columns), (odd-numbered rows, even-numbered columns), and (odd-numbered rows, odd-numbered columns) of the orthogonal transformation block after resolution transformation are calculated using the nature of orthogonal transformation, whereby the advantage of being capable of improving the computation processing of resolution transformation can be provided.

In a fifth aspect of the invention, to generate orthogonal transformation blocks with a plurality of resolutions at the same time, the intermediate information data generated for one resolution transformation processing is used for another resolution transformation processing, whereby the advantage of being capable of improving the resolution transformation processing and the image quality after resolution transformation can be provided.

In a sixth aspect of the invention, the quantization values and quantization matrix of orthogonal transformation blocks before and after resolution transformation are input and requantization is also performed at the same time in the resolution transformation process, whereby the advantage of being capable of improving the computation efficiency of the whole resolution transformation also containing quantization can be provided.

In a seventh of the invention, to execute resolution transformation containing quantization, constant terms of transformation expressions multiplied by the coefficient ratio of a default quantization matrix are stored in nonvolatile memory corresponding to all longitudinal and lateral change ratios, whereby the advantage of being capable of eliminating processing of generating the transformation expression containing quantization in response to the longitudinal and lateral change ratios can be provided.

In an eighth aspect of the invention, to assign one quantization value to 2×2 four orthogonal transformation blocks as in MPEG and generate a plurality of images different in resolutions at the same time, the intermediate information data after quantization generated for one resolution transformation processing is used for another resolution transformation processing, whereby the advantage of being capable of improving the computation efficiency of the whole resolution transformation also containing quantization can be provided.

What is claimed is:

1. A resolution transformation apparatus of an orthogonal transformation image for changing the number of pixels thereof comprises:

longitudinal and lateral change ratio input means for inputting longitudinal and lateral change ratios of the image;

low-frequency orthogonal transformation block extraction means for determining the number of orthogonal transformation blocks required for resolution transformation, N, from the longitudinal and lateral change ratios input from said longitudinal and lateral change ratio input means and extracting only low-frequency areas of the N orthogonal transformation blocks from before-transformation orthogonal transformation image memory for storing orthogonal transformation images before undergoing resolution transformation;

resolution transformation means for determining the number of orthogonal transformation blocks to be generated after resolution transformation, M, from the longitudinal and lateral change ratios input from said longitudinal and lateral change ratio input means and executing resolution transformation and generating M orthogonal transformation blocks from the N low-frequency orthogonal transformation blocks extracted by said low-frequency orthogonal transformation block extraction means; and orthogonal transformation block storage means for storing the Morthogonal transformation blocks generated by said resolution transformation means in after-transformation orthogonal transformation image memory for storing orthogonal transformation images after undergoing resolution transformation.

2. The resolution transformation apparatus of an orthogonal transformation image as claimed in claim 1 wherein said resolution transformation means comprises transformation portion generation means for generating a transformation matrix or a transformation expression required for executing resolution transformation from the longitudinal and lateral change ratios input from said longitudinal and lateral change ratio input means and storing the transformation matrix or the transformation expression in temporary memory and resolution transformation computation means for performing resolution transformation computation using the transformation matrix or the transformation expression in the temporary memory.

3. The resolution transformation apparatus of an orthogonal transformation image as claimed in claim 1 wherein said resolution transformation means comprises nonvolatile memory previously storing transformation matrixes or transformation expressions required for executing resolution transformation corresponding to all longitudinal and lateral change ratios that can be input from said longitudinal and lateral change ratio input means and resolution transformation computation means for extracting the transformation matrix or the transformation expression corresponding to the change ratio specified from said longitudinal and lateral change ratio input means from the nonvolatile memory and performing resolution transformation computation.

4. The resolution transformation apparatus of an orthogonal transformation image as claimed in claim 1 wherein if the orthogonal transformation blocks in the before-transformation orthogonal transformation image memory are one-dimensional orthogonal transformation blocks in a lateral direction, said resolution transformation means comprises first resolution transformation means for performing averaging processing or thinning-out processing among the orthogonal transformation blocks using the longitudinal change ratio input from said longitudinal and lateral change ratio input means and second resolution transformation means for executing resolution transformation in the orthogonal transformation blocks using the lateral change ratio.

5. The resolution transformation apparatus of an orthogonal transformation image as claimed in claim 1 wherein if the orthogonal transformation blocks in the before-transformation orthogonal transformation image memory are one-dimensional orthogonal transformation blocks in a longitudinal direction, said resolution transformation means comprises first resolution transformation means for performing averaging processing or thinning-out processing among the orthogonal transformation blocks using the lateral change ratio input from said longitudinal and lateral change ratio input means and second resolution transformation means for executing resolution transformation in the orthogonal transformation blocks using the longitudinal change ratio.

6. The resolution transformation apparatus of an orthogonal transformation image as claimed in claim 4 or 5 wherein if the change ratio used with the second resolution transformation means is a half even-numbered'th and odd-numbered'th coefficients of the orthogonal transformation block generated by the second resolution transformation means are calculated at high speed using the nature of orthogonal transformation.

7. The resolution transformation apparatus of an orthogonal transformation image as claimed in claim 1 wherein if the orthogonal transformation blocks in the before-transformation orthogonal transformation image memory are two-dimensional orthogonal transformation blocks and the longitudinal and lateral change ratios input from said longitudinal and lateral change ratio input means are each a half, coefficients on (even-numbered rows, even-numbered columns), (even-numbered rows, odd-numbered columns), (odd-numbered rows, even-numbered columns), and (odd-numbered rows, odd-numbered columns) of the orthogonal transformation block generated by said resolution transformation means are calculated at high speed using the nature of orthogonal transformation.

8. The resolution transformation apparatus of an orthogonal transformation image as claimed in claim 1 wherein said resolution transformation means comprises temporary memory of orthogonal transformation image for temporarily storing the orthogonal transformation block after undergoing resolution transformation and further executes resolution transformation of the image after undergoing resolution transformation according to the change ratio input from said longitudinal and lateral change ratio input means.

9. The resolution transformation apparatus of an orthogonal transformation image as claimed in claim 1 wherein to generate a plurality of orthogonal transformation images different in resolution from the same before-transformation orthogonal transformation image memory, said resolution transformation means comprises a plurality of resolution transformation means for generating orthogonal transformation images different in resolution and temporary memory of intermediate data capable of temporarily storing intermediate data being undergoing resolution transformation with the plurality of resolution transformation means and wherein if information generated by one resolution transformation means, namely, third resolution transformation means during the resolution transformation is information effective for transformation processing of another resolution transformation means, namely, fourth resolution transformation means, the information is stored in the temporary memory of intermediate data and the fourth resolution transformation means performs transformation processing from the temporary memory of intermediate data.

10. The resolution transformation apparatus of an orthogonal transformation image as claimed in claim 1 further including quantization value input means for inputting (N+M) quantization values of orthogonal transformation blocks before and after resolution transformation to transform resolution from N low-frequency orthogonal transformation blocks to M orthogonal transformation blocks and quantization matrix input means for inputting a quantization matrix of the orthogonal transformation blocks before and after resolution transformation, wherein said resolution transformation means also performs requantization at the same time in the resolution transformation process using the quantization values input from said quantization value input means and the quantization matrix input from said quantization matrix input means.

11. The resolution transformation apparatus of an orthogonal transformation image as claimed in claim 10 wherein said resolution transformation means comprises transformation portion generation means for generating a transformation expression required for executing resolution transformation from the longitudinal and lateral change ratios input from said longitudinal and lateral change ratio input means and the quantization matrixes before and after resolution transformation input from said quantization matrix input means and storing the transformation expression in temporary memory and resolution transformation computation means for performing resolution transformation computation using the transformation expression in the temporary memory and the quantization values input from said quantization value input means.

12. The resolution transformation apparatus of an orthogonal transformation image as claimed in claim 10 wherein said resolution transformation means comprises nonvolatile memory previously storing all transformation expressions required for executing resolution transformation calculated from all longitudinal and lateral change ratios that can be input from said longitudinal and lateral change ratio input means and default quantization matrixes input from said quantization matrix input means and resolution transformation computation means for extracting the transformation expression corresponding to the change ratio specified from said longitudinal and lateral change ratio input means from the nonvolatile memory and performing resolution transformation computation using the quantization value input from said quantization value input means.

13. The resolution transformation apparatus of an orthogonal transformation image as claimed in claim 8 or 9 wherein if one quantization value is assigned to a plurality of orthogonal transformation blocks before resolution transformation, said resolution transformation means also performs requantization at the same time in the resolution transformation process.

14. The resolution transformation apparatus of an orthogonal transformation image as claimed in claim 1 wherein said low-frequency orthogonal transformation block extraction means assumes that the orthogonal transformation block coefficients of some of the extracted low-frequency areas are 0 and said resolution transformation means does not perform computation on the coefficients assumed to be 0 by said low-frequency orthogonal transformation block extraction means.

15. In a resolution transformation apparatus for changing the number of pixels of an image, a resolution transformation method of an orthogonal transformation image comprises the steps of:

longitudinal and lateral change ratio input step of inputting longitudinal and lateral change ratios of the image;

low-frequency orthogonal transformation block extraction step of determining the number of orthogonal transformation blocks required for resolution transformation, N, from the longitudinal and lateral change ratios input at said longitudinal and lateral change ratio input step and extracting only low-frequency areas of the N orthogonal transformation blocks;

resolution transformation step of determining the number of orthogonal transformation blocks to be generated after resolution transformation, M, from the longitudinal and lateral change ratios input at said longitudinal and lateral change ratio input step and executing resolution transformation and generating M orthogonal transformation blocks from the N low-frequency orthogonal transformation blocks extracted at said low-frequency orthogonal transformation block ex traction step; and orthogonal transformation block storage step of outputting the M orthogonal transformation blocks generated at said resolution transformation step.

16. The resolution transformation method of an orthogonal transformation image as claimed in claim 15 wherein if the orthogonal transformation blocks are one-dimensional orthogonal transformation blocks in a lateral direction, said resolution transformation step comprises first resolution transformation step of performing averaging processing or thinning-out processing among the orthogonal transformation blocks using the longitudinal change ratio input at said longitudinal and lateral change ratio input step and second resolution transformation step of executing resolution transformation in the orthogonal transformation blocks using the lateral change ratio.

17. The resolution transformation method of an orthogonal transformation image as claimed in claim 15 wherein if the orthogonal transformation blocks are one-dimensional orthogonal transformation blocks in a longitudinal direction, said resolution transformation step comprises first resolution transformation step of performing averaging processing or thinning-out processing among the orthogonal transformation blocks using the lateral change ratio input at said longitudinal and lateral change ratio input step and second resolution transformation step of executing resolution transformation in the orthogonal transformation blocks using the longitudinal change ratio.

18. The resolution transformation method of an orthogonal transformation image as claimed in claim 16 or 17 wherein if the change ratio used with the second resolution transformation step is a half, even-numbered'th and odd-numbered'th coefficients of the orthogonal transformation block generated at the second resolution transformation step are calculated at high speed using the nature of orthogonal transformation.

19. The resolution transformation method of an orthogonal transformation image as claimed in claim 15 wherein if the orthogonal transformation blocks are two-dimensional orthogonal transformation blocks and the longitudinal and lateral change ratios input at said longitudinal and lateral change ratio input step are each a half, coefficients on (even-numbered rows, even-numbered columns), (even-numbered rows, odd-numbered columns), (odd-numbered rows, even-numbered columns), and (odd-numbered rows, odd-numbered columns) of the orthogonal transformation block generated at said resolution transformation step are calculated at high speed using the nature of orthogonal transformation.

20. The resolution transformation method of an orthogonal transformation image as claimed in claim 15 wherein said resolution transformation step is to temporarily store the orthogonal transformation block after undergoing resolution transformation and further execute resolution transformation of the image after undergoing resolution transformation according to the change ratio input at said longitudinal and lateral change ratio input step.

21. The resolution transformation method of an orthogonal transformation image as claimed in claim 15 wherein to generate a plurality of orthogonal transformation images different in resolution, said resolution transformation step comprises a plurality of resolution transformation steps for generating orthogonal transformation images different in resolution and wherein information generated at one resolution transformation step during the resolution transformation is used effectively for transformation processing of another resolution transformation step.

22. The resolution transformation method of an orthogonal transformation image as claimed in claim 15 further comprising quantization value input step of inputting (N+M) quantization values of orthogonal transformation blocks before and after resolution transformation to transform resolution from N low-frequency orthogonal transformation blocks to M orthogonal transformation blocks and quantization matrix input step of inputting a quantization matrix of the orthogonal transformation blocks before and after resolution transformation, wherein said resolution transformation step is also to perform requantization at the same time in the resolution transformation process using the quantization values input at said quantization value input step and the quantization matrix input at said quantization matrix input step.

23. The resolution transformation method of an orthogonal transformation image as claimed in claim 20 or 21 wherein if one quantization value is assigned to a plurality of orthogonal transformation blocks, said resolution transformation step is also to perform requantization at the same time in the resolution transformation process.

24. The resolution transformation method of an orthogonal transformation image as claimed in claim 15 wherein said low-frequency orthogonal transformation block extraction step assumes that the orthogonal transformation block coefficients of some of the extracted low-frequency areas are 0 and said resolution transformation step does not perform computation on the coefficients assumed to be 0 at said low-frequency orthogonal transformation block extraction means.

* * * * *